United States Patent
Liu et al.

(10) Patent No.: US 11,870,719 B2
(45) Date of Patent: Jan. 9, 2024

(54) METHOD AND DEVICE USED IN COMMUNICATION NODE FOR WIRELESS COMMUNICATION

(71) Applicants: Zheng Liu, Shanghai (CN); Xiaobo Zhang, Shanghai (CN); Lin Yang, Shanghai (CN)

(72) Inventors: Zheng Liu, Shanghai (CN); Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 340 days.

(21) Appl. No.: 17/148,590

(22) Filed: Jan. 14, 2021

(65) Prior Publication Data
US 2021/0135820 A1    May 6, 2021

Related U.S. Application Data

(63) Continuation of application No. PCT/CN2019/104051, filed on Sep. 2, 2019.

(30) Foreign Application Priority Data

Sep. 29, 2018  (CN) .......................... 201811147284.1

(51) Int. Cl.
*H04L 5/00* (2006.01)
*H04W 72/0446* (2023.01)
(Continued)

(52) U.S. Cl.
CPC ............ *H04L 5/0048* (2013.01); *H04L 5/001* (2013.01); *H04L 5/0094* (2013.01);
(Continued)

(58) Field of Classification Search
CPC . H04W 72/23; H04W 72/231; H04W 72/232; H04W 72/0446; H04L 5/001; H04L 5/0048; H04L 5/0094
See application file for complete search history.

(56) References Cited

U.S. PATENT DOCUMENTS

2014/0341133 A1* 11/2014 Wang ........................ H04L 5/00
                                                         370/329
2015/0117309 A1    4/2015 Gage et al.
(Continued)

FOREIGN PATENT DOCUMENTS

CN    107896390 A    4/2018
CN    107925552 A    4/2018
(Continued)

OTHER PUBLICATIONS

3GPP TSG-RAN WG2 Meeting#95bis,ZTE "R2-166074 Further consideration on Multi-carrier PRACH in NB-IoT", Oct. 14, 2016.
(Continued)

*Primary Examiner* — Kevin C. Harper

(57) ABSTRACT

The present disclosure provides a method and device used in communication node for wireless communication. The communication node first receives first information on a first carrier, the first information being used for determining a first time interval; then receives a first reference signal in a first time window on a second carrier; the first time window is one of X time windows; each of the X time windows belongs to the first time interval, X being a positive integer greater than 1; at least one of a physical-cell identifier to which a transmitter of the first reference signal belongs, a position of frequency-domain resources occupied by the first reference signal in frequency domain or a position of the first time interval in time domain is used for determining the first
(Continued)

time window out of the X time windows. The present disclosure reduces interference and overhead.

20 Claims, 13 Drawing Sheets

(51) Int. Cl.
  *H04W 72/23* (2023.01)
  *H04W 72/12* (2023.01)
(52) U.S. Cl.
  CPC ....... *H04W 72/0446* (2013.01); *H04W 72/23* (2023.01); *H04W 72/12* (2013.01)

(56) References Cited

U.S. PATENT DOCUMENTS

2018/0124644 A1\* 5/2018 Rico Alvarino ...... H04W 28/18
2019/0253231 A1\* 8/2019 Park ...................... H04L 5/1469

FOREIGN PATENT DOCUMENTS

| CN | 108023722 A | 5/2018 |
| CN | 108207029 A | 6/2018 |
| WO | 2018151564 A1 | 8/2018 |

OTHER PUBLICATIONS

ISR received in application No. PCT/CN2019/104051 dated Dec. 3, 2019.
CN201811147284.1 Notification to Grant Patent Right for Invention dated Sep. 22, 2020.
CN201811147284.1 1st Office Action dated Aug. 5, 2020.
CN201811147284.1 First Search Report dated Jul. 28, 2020.

\* cited by examiner

| First time length | Radio frames to which initial subframes of X time windows belong | Initial subframes of X time windows |
|---|---|---|
| 1/2 T | (SFN+1) mod T= 2*{1,2,3, ...,1/2T} | #9 |
| T | All radio frames in first time interval | #9 |
| 2T | All radio frames in first time interval | #4, #9 |

FIG. 9

| Physical-cell identifier | Position of frequency domain | Position of time domain | First parameter | Index of first time window |
|---|---|---|---|---|
| 105 | 1 | 1 | 105 | 105 |
| 264 | 2 | 2 | 1056 | 32 |
| 453 | 3 | 3 | 4077 | 493 |
| 521 | 4 | 4 | 8336 | 144 |

FIG. 11

METHOD AND DEVICE USED IN COMMUNICATION NODE FOR WIRELESS COMMUNICATION

CROSS REFERENCE TO RELATED APPLICATIONS

This application is a continuation of International Application No. PCT/CN2019/104051, filed Sep. 2, 2019, claims the priority benefit of Chinese Patent Application No. 201811147284.1, filed on Sep. 29, 2018, the full disclosure of which is incorporated herein by reference.

BACKGROUND

Technical Field

The present disclosure relates to transmission schemes in wireless communication systems, and in particular to a method and device of Narrow Band Internet of Things (NB-IoT).

Related Art

In order to meet diverse requirements of IoT applications, Narrow Band Internet of Things (NB-IoT), a new narrowband wireless access system, is introduced in Rel-13 of the $3^{rd}$ Generation Partner Project (3GPP). Apart from the NB-IoT system, efforts are also made in the 3GPP to standardize properties of the Enhanced Machine Type Communication (eMTC). The NB-IoT system and the eMTC system are targeted at different market demands.

Features of the NB-IoT system and the eMTC system of Rel-13 have both been enhanced in 3GPP Rel-14. In terms of NB-IoT, a notable enhancement is to empower non-anchor Physical Resource Blocks (PRB) with more functionalities, such as supporting transmission of a paging channel, transmission of a random access channel, and additional ones of positioning and multicast. Further enhancements in NB-IoT are included in 3GPP Rel-15, including reducing power consumption, increasing measurement precision and introducing special scheduling requests. At the 3GPP RAN #80 Plenary, a decision has been made on continuing evolution of the NB-IoT system and the eMTC system in Rel-16.

SUMMARY

As decided in Working Item Descriptions (WIDs) of the NB-IoT in Rel-16, support will be given to transmissions of Narrow band Reference Signals (NRS) on non-anchor carriers even without paging messages. When turned on, no matter whether there are transmissions of other channels or signals, the transmissions of NRSs are always-on, thus bringing a larger overhead. Besides, due to the always-on property, inter-cell interference will also increase, thus resulting in a decrease in system performance. In addition, when non-anchor carriers in the NB-IoT system operate in in-band mode, the always-on NRS transmissions will hinder resource sharing by Long Term Evolution (LTE) or New Radio (NR) with NB-IoT even without NB-IoT traffic transmission, which reduces spectrum efficiency.

A solution is provided in the present disclosure to address the issue of transmitting NRSs on non-anchor carriers. It should be noted that the embodiments of a User Equipment (UE) in the present disclosure and the characteristics of the embodiments may be applied to a base station if no conflict is incurred, and vice versa. Further, the embodiments and the characteristics of the embodiments in the present disclosure may be mutually combined if no conflict is incurred.

The present disclosure provides a method in a first-type communication node for wireless communications, comprising:

receiving first information on a first carrier, the first information being used for determining a first time interval; and receiving a first reference signal in a first time window on a second carrier;

herein, the first time window is one of X time windows; each of the X time windows belongs to the first time interval, X being a positive integer greater than 1; at least one of a physical cell identifier to which a transmitter of the first reference signal belongs, a position of frequency-domain resources occupied by the first reference signal in frequency domain or a position of the first time interval in time domain is used for determining the first time window out of the X time windows; the first carrier and the second carrier are two different carriers; the first information is transmitted via an air interface.

In one embodiment, at least one of a physical cell identifier to which a transmitter of the first reference signal, a position of frequency-domain resources occupied by the first reference signal in frequency domain or a position of the first time interval in time domain is used for determining the first time window out of the X time windows, in this way, resources occupied by always-on NRSs on non-anchor carriers can be randomized, which reduces inter-cell interference as well as the impact on LTE or NR scheduler when scheduling resources, and improves performance of NB-IoT and LTE or NR system.

According to one aspect of the present disclosure, the above method is characterized in that each of the X time windows comprises a positive integer number of subframe (s), each of the X time windows has a subframe reserved for transmitting a scheduling message for paging, and a position of an initial subframe reserved for transmitting a scheduling message for paging is fixed within a time window to which it belongs, for each of the X time windows.

In one embodiment, when there is a paging message to be transmitted, the NRS will be transmitted along with a Narrow band Physical Downlink Control Channel (NPDCCH) that schedules a paging channel, thus each of the X time windows has a subframe for transmitting a scheduling message for paging, guaranteeing that the always-on NRS transmitted on a non-anchor carrier always occurs on resources that may transmit an NRS when there is a paging transmission, therefore when there is a paging transmission, an NRS overhead may be reduced, and inter-cell interface as well as impact on LTE/NR system will also be decreased.

According to one aspect of the present disclosure, the above method is characterized in that a first time sub-window belongs to the first time window, a time length of the first time sub-window is no longer than a time length of the first time window, and the first time sub-window comprises time-domain resources occupied by the first reference signal; a position of the first time sub-window in the first time window is pre-defined, or a position of the first time sub-window in the first time window is configured, or a position of the first time sub-window in the first time window is related to at least one of a physical-cell identifier to which a transmitter of the first reference signal belongs, a position of frequency-domain resources occupied by the first reference signal in frequency domain or a position of the first time interval in time domain.

According to one aspect of the present disclosure, the above method is characterized in comprising:
    receiving second information;
    herein, the second information is used for indicating a first time length, the first time length is equal to a time length of the first time interval multiplied by an integer power of 2, the first time length is used for determining the X time windows out of the first time interval, and the second information is transmitted via the air interface.

According to one aspect of the present disclosure, the above method is characterized in al so comprising:
    receiving third information;
    herein, the third information is used for determining a time length of the first time window, and the third information is transmitted via the air interface.

According to one aspect of the present disclosure, the above method is characterized in that the X time windows are indexed in order, at least one of a physical-cell identifier to which the transmitter of the first reference signal, a position of frequency-domain resources occupied by the first reference signal in frequency domain or a position of the first time interval in time domain is used for determining a first parameter, the first parameter is a non-negative integer, and a remainder of the first parameter modulo the X is used for determining an index of the first time window.

The present disclosure provides a method in a second-type communication node for wireless communications, comprising:
    transmitting first information on a first carrier, the first information being used for determining a first time interval; and
    transmitting a first reference signal in a first time window on a second carrier;
    herein, the first time window is one of X time windows; each of the X time windows belongs to the first time interval, X being a positive integer greater than 1; at least one of a physical cell identifier to which a transmitter of the first reference signal belongs, a position of frequency-domain resources occupied by the first reference signal in frequency domain or a position of the first time interval in time domain is used for determining the first time window out of the X time windows; the first carrier and the second carrier are two different carriers; the first information is transmitted via an air interface.

According to one aspect of the present disclosure, the above method is characterized in that each of the X time windows comprises a positive integer number of subframe(s), each of the X time windows has a subframe reserved for transmitting a scheduling message for paging, and a position of an initial subframe reserved for transmitting a scheduling message for paging is fixed within a time window to which it belongs, for each of the X time windows.

According to one aspect of the present disclosure, the above method is characterized in that a first time sub-window belongs to the first time window, a time length of the first time sub-window is no longer than a time length of the first time window, and the first time sub-window comprises time-domain resources occupied by the first reference signal; a position of the first time sub-window in the first time window is pre-defined, or a position of the first time sub-window in the first time window is configured, or a position of the first time sub-window in the first time window is related to at least one of a physical-cell identifier to which a transmitter of the first reference signal belongs, a position of frequency-domain resources occupied by the first reference signal in frequency domain or a position of the first time interval in time domain.

According to one aspect of the present disclosure, the above method is characterized in al so comprising:
    transmitting second information;
    herein, the second information is used for indicating a first time length, the first time length is equal to a time length of the first time interval multiplied by an integer power of 2, the first time length is used for determining the X time windows out of the first time interval, and the second information is transmitted via the air interface.

According to one aspect of the present disclosure, the above method is characterized in al so comprising:
    transmitting third information;
    herein, the third information is used for determining a time length of the first time window, and the third information is transmitted via the air interface.

According to one aspect of the present disclosure, the above method is characterized in that the X time windows are indexed in order, at least one of a physical-cell identifier to which the transmitter of the first reference signal, a position of frequency-domain resources occupied by the first reference signal in frequency domain or a position of the first time interval in time domain is used for determining a first parameter, the first parameter is a non-negative integer, and a remainder of the first parameter modulo the X is used for determining an index of the first time window.

The present disclosure provides a first-type communication node for wireless communications, comprising:
    a first receiver, receiving first information on a first carrier, the first information being used for determining a first time interval; and
    a second receiver, receiving a first reference signal in a first time window on a second carrier;
    herein, the first time window is one of X time windows; each of the X time windows belongs to the first time interval, X being a positive integer greater than 1; at least one of a physical cell identifier to which a transmitter of the first reference signal belongs, a position of frequency-domain resources occupied by the first reference signal in frequency domain or a position of the first time interval in time domain is used for determining the first time window out of the X time windows; the first carrier and the second carrier are two different carriers; the first information is transmitted via an air interface.

The present disclosure provides a second-type communication node for wireless communications, comprising:
    a first transmitter, transmitting first information on a first carrier, the first information being used for determining a first time interval; and
    a second transmitter, transmitting a first reference signal in a first time window on a second carrier;
    herein, the first time window is one of X time windows; each of the X time windows belongs to the first time interval, X being a positive integer greater than 1; at least one of a physical cell identifier to which a transmitter of the first reference signal belongs, a position of frequency-domain resources occupied by the first reference signal in frequency domain or a position of the first time interval in time domain is used for determining the first time window out of the X time windows; the first carrier and the second carrier are two different carriers; the first information is transmitted via an air interface.

In one embodiment, the method in the present disclosure is advantageous in the following aspects:
    According to a cell ID, and/or an index of a non-anchor carrier, and/or a time-domain position relation, resources occupied by an always-on NRS on a non-anchor carrier are randomized, which reduces inter-cell interference and impact on LTE/NR scheduler when scheduling resources, and improves performance of NB-IoT and LTE or NR system.

Resources occupied by an always-on NRS on a non-anchor carrier are limited to possible NRS resources when a paging message is assumed to be transmitted, thus NRS overhead can be reduced when there is a paging transmission, and the inter-cell interference and impact on the LTE/NR system will be further reduced simultaneously.

BRIEF DESCRIPTION OF THE DRAWINGS

Other features, objects and advantages of the present disclosure will become more apparent from the detailed description of non-restrictive embodiments taken in conjunction with the following drawings:

FIG. 9 illustrates a schematic diagram of relations of a first time length and X time windows according to one embodiment of the present disclosure.

FIG. 11 illustrates a schematic diagram of a relation between a first parameter and a first time window according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
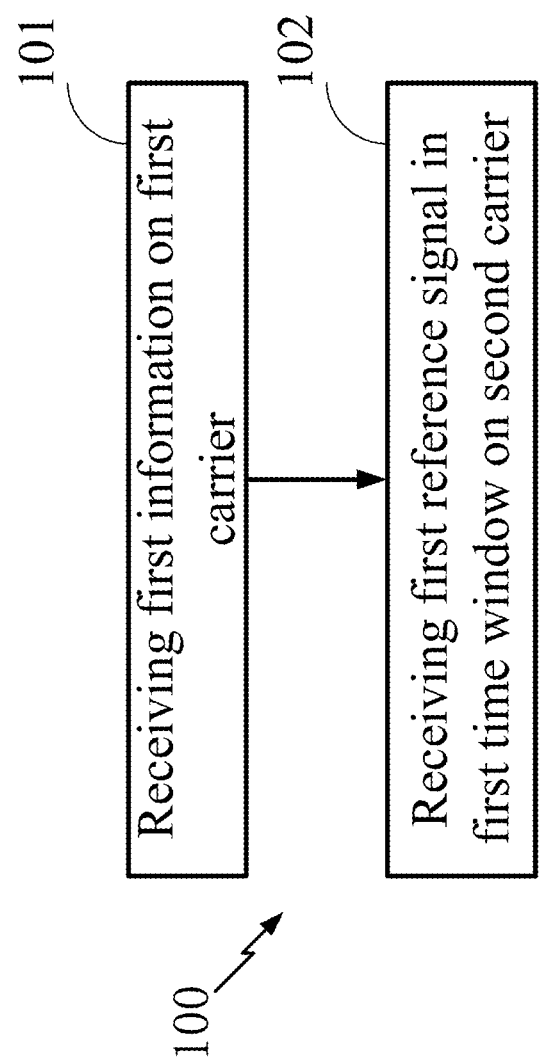
FIG. 1 illustrates a flowchart of transmissions of first information and a first reference signal according to one embodiment of the present disclosure.

Embodiment 1 illustrates a flowchart of transmissions of first information and a first reference signal according to one embodiment of the present disclosure, as shown in FIG. 1. In FIG. 1, each box represents a step.

In Embodiment 1, a first-type communication node in the present disclosure first receives first information on a first carrier, the first information being used for determining a first time interval; receives a first reference signal in a first time window on a second carrier; herein, the first time window is one of X time windows; each of the X time windows belongs to the first time interval, X being a positive integer greater than 1; at least one of a physical cell identifier to which a transmitter of the first reference signal belongs, a position of frequency-domain resources occupied by the first reference signal in frequency domain or a position of the first time interval in time domain is used for determining the first time window out of the X time windows; the first carrier and the second carrier are two different carriers; the first information is transmitted via an air interface.

In one embodiment, the first carrier is an NB-IoT anchor carrier.

In one embodiment, an index of the first carrier is 0.

In one embodiment, the first carrier is a carrier for transmitting an NB-IoT synchronization signal and a system message.

In one embodiment, the second carrier is an NB-IoT non-anchor carrier.

In one embodiment, an index value of the second carrier is greater than 0.

In one embodiment, the second carrier cannot transmit an NB-IoT synchronization signal and a system message.

In one embodiment, a transmission bandwidth of the first carrier is 180 KHz.

In one embodiment, a system bandwidth of the first carrier is 180 KHz.

In one embodiment, a system bandwidth of the first carrier is 200 KHz.

In one embodiment, a transmission bandwidth of the second carrier is 180 KHz.

In one embodiment, a system bandwidth of the second carrier is 180 KHz.

In one embodiment, a system bandwidth of the second carrier is 200 KHz.

In one embodiment, the first carrier is a carrier that an NB-IoT works in Standalone Mode.

In one embodiment, the first carrier is a carrier that an NB-IoT works in Guard-band Mode.

In one embodiment, the first carrier is a carrier that an NB-IoT works in In-band Mode.

In one embodiment, the second carrier is a carrier that an NB-IoT works in Standalone Mode.

In one embodiment, the second carrier is a carrier that an NB-IoT works in Guard-band Mode.

In one embodiment, the second carrier is a carrier that an NB-IoT works in In-band Mode.

In one embodiment, center frequencies of the first carrier and the second carrier are different.

In one embodiment, there does not exist a frequency resource that belongs to the first carrier and the second carrier simultaneously.

In one embodiment, the first carrier and the second carrier are orthogonal in frequency domain.

In one embodiment, the first information is transmitted via a higher-layer signaling.

In one embodiment, the first information is transmitted via a physical-layer signaling.

In one embodiment, the first information comprises all or part of a higher-layer signaling.

In one embodiment, the first information comprises all or part of a physical-layer signaling.

In one embodiment, the first information is transmitted through a Downlink Shared Channel (DL-SCH).

In one embodiment, the first information is transmitted through a Physical Downlink Shared Channel (PDSCH).

In one embodiment, the first information comprises all or part of Information Elements (IE) in a Radio Resource Control (RRC) signaling.

In one embodiment, the first information comprises all or part of fields in an IE in an RRC signaling.

In one embodiment, the first information is transmitted through a Narrow-band Physical Downlink Shared Channel (NPDSCH).

In one embodiment, the first information comprises one or more fields in a System Information Block (SIB).

In one embodiment, the first information is broadcast.

In one embodiment, the first information is unicast.

In one embodiment, the first information is cell-specific.

In one embodiment, the first information is UE-specific.

In one embodiment, the first information is transmitted through a Physical Downlink Control Channel (PDCCH).

In one embodiment, the first information is transmitted through an NPDCCH.

In one embodiment, the first information comprises all or part of fields of a Downlink Control Information (DCI) signaling.

In one embodiment, the first information comprises "defaultPagingCycle-r13" in "PCCH-Config-NB-r13" in "RadioResourceConfigCommonSIB-NB-r13" in 3GPP TS36.331 (V15.2.0), section 6. 7. 3. 2.

In one embodiment, the first information comprises "drx-Cycle-r13" in "MAC-MainConfig-NB" in 3GPP TS36.331 (V15.2.0), section 6. 7. 3. 2.

In one embodiment, the first information comprises "drx-Cycle-v1430" in "MAC-MainConfig-NB" in 3GPP TS36.331 (V15.2.0), section 6. 7. 3. 2.

In one embodiment, the first information comprises information for configuring Paging Time Window (PTW) length.

In one embodiment, the first information being used for determining the first time interval means that the first information is used by the first-type communication node for determining the first time interval.

In one embodiment, the first information being used for determining the first time interval means that the first information directly indicates the first time interval.

In one embodiment, the first information being used for determining the first time interval means that the first information indirectly indicates the first time interval.

In one embodiment, the first information being used for determining the first time interval means that the first information explicitly indicates the first time interval.

In one embodiment, the first information being used for determining the first time interval means that the first information implicitly indicates the first time interval.

In one embodiment, the first time interval is a time interval corresponding to a Discontinuous Reception (DRX) period.

In one embodiment, the first time interval is a time interval corresponding to that a DXR period shifts forward (to an earlier time) 10 subframes.

In one embodiment, the first time interval is a time interval corresponding to positive integer number of consecutive DRX periods.

In one embodiment, the first time interval is a time interval corresponding to that a positive integer number of consecutive DXR periods shift forward (to an earlier time) 10 subframes.

In one embodiment, the first time interval is part of a time interval corresponding to a DRX period.

In one embodiment, the first time interval is part of a time interval corresponding to that a DXR period shifts forward (to an earlier time) 10 subframes.

In one embodiment, the first time interval is a time interval corresponding to a PTW within an extended Discontinuous Reception (eDRX) period.

In one embodiment, the first time interval is a time interval corresponding to that a PTW within an eDRX period shifts forward (to an earlier time) 10 subframes.

In one embodiment, the first time interval is a time interval corresponding to a positive integer number of consecutive PTWs within an eDRX period.

In one embodiment, the first time interval is a time interval corresponding to that a positive integer number of consecutive PTWs within an eDRX period shift forward (to an earlier time) 10 subframes.

In one embodiment, the first time interval is part of a time interval corresponding to a PTW within an eDRX period.

In one embodiment, the first time interval is part of a time interval corresponding to that a PTW within an eDRX period shifts forward (to an earlier time) 10 subframes.

In one embodiment, the first time interval is a time interval corresponding to an eDRX period.

In one embodiment, the first time interval is a time interval corresponding to that an eDXR period shifts forward (to an earlier time) 10 subframes.

In one embodiment, the first time interval is a time interval corresponding to a positive integer number of consecutive eDRX periods.

In one embodiment, the first time interval is a time interval corresponding to that a positive integer number of consecutive eDXR periods shift forward (to an earlier time) 10 subframes.

In one embodiment, the first time interval is part of a time interval corresponding to an eDRX period.

In one embodiment, the first time interval is part of a time interval corresponding to that an eDXR period shifts forward (to an earlier time) 10 subframes.

In one embodiment, a time length of the first time interval is equal to a DRX period multiplied by an integer power of 2.

In one embodiment, a time length of the first time interval is equal to an eDRX period multiplied by an integer power of 2.

In one embodiment, a time length of the first time interval is equal to a PTW time length multiplied by an integer power of 2 within an eDRX period.

In one embodiment, the first reference signal is a Narrow Band Reference Signal (NRS).

In one embodiment, when turned on, whether there are other signals or channels being transmitted or not, a transmission of the first reference signal is always-on.

In one embodiment, the first reference signal is generated by a signature sequence, and the signature sequence is a Gold sequence.

In one embodiment, the first reference signal is generated by a signature sequence, and the signature sequence is an m sequence.

In one embodiment, the first reference signal is generated by a signature sequence, and the signature sequence is a pseudo-random sequence.

In one embodiment, the first reference signal is transmitted via the air-interface.

In one embodiment, the first reference signal can be used for demodulations of other channels.

In one embodiment, the first reference signal can be used as a channel estimation.

In one embodiment, the first reference signal can be used as a measurement.

In one embodiment, the first reference signal can be used as a mobile management.

In one embodiment, the first reference signal can be used as a Radio Resource Management (RRM).

In one embodiment, the first reference signal can be used as a Time and Frequency Tracking.

In one embodiment, the first reference signal can be used as an early decoding of an NPDCCH that schedules paging.

In one embodiment, the first reference signal can be used as an early termination of monitoring of an NPDCCH that schedules paging.

In one embodiment, the first reference signal can be used as an early decoding of a Wake Up Signal (WUS).

In one embodiment, the first reference signal can be used as an early termination of monitoring of a WUS.

In one embodiment, an employment of the first reference signal is implementation-related.

In one embodiment, any two of the X time windows are orthogonal in time domain.

In one embodiment, there exist two of the X time windows that are non-orthogonal in time domain.

In one embodiment, there exist two of the X time windows that comprise a same time-domain resource.

In one embodiment, there exist two of the X time windows that are partial overlapped.

In one embodiment, time lengths of any two of the X time windows are equal.

In one embodiment, there exist time lengths of two of the X time windows that are unequal.

In one embodiment, any of the X time windows comprises Type-1 Common Search Space (CSS) in 3GPP TS36.213 (V15.2.0), section 16. 6.

In one embodiment, any of the X time windows comprises CSS used for scheduling paging.

In one embodiment, any of the X time windows comprises SS used for monitoring an SS of an NPDCCH scrambled by P-RNTI.

In one embodiment, any of the X time windows comprises a Paging Occasion (PO) subframe.

In one embodiment, any of the X time windows comprises Type-1 CSS in 3GPP TS36.213 (V15.2.0), section 16. 6, as well as 10 subframes before the Type-1 CSS and 4 subframes after the Type-1 CSS.

In one embodiment, any of the X time windows comprises 10 subframes before a PO.

In one embodiment, any of the X time windows comprises 10 subframes before a PO (a PO of the first-type communication node or a PO of a node other than the first-type communication node).

In one embodiment, for the given first time interval, the X time windows are pre-defined.

In one embodiment, for the given first time interval, the first time interval is divided into X parts to acquire the X time windows.

In one embodiment, the X is configured, for the given first time interval, the first time interval is equally divided into X parts to acquire the X time windows.

In one embodiment, also comprising:
receiving fourth information;
herein, the fourth information is used for indicating the X, and the first time interval is equally divided into X parts to acquire the X time windows.

In one embodiment, also comprising:
receiving fourth information;
herein, the fourth information is used for indicating a target time length, a time length of each of the X time windows is equal to the target time length, and the X time windows are acquired by dividing the first time interval equally by the target time length.

In one embodiment, the phrase that at least one of a physical cell identifier to which a transmitter of the first reference signal belongs, a position of frequency-domain resources occupied by the first reference signal in frequency domain or a position of the first time interval in time domain is used for determining the first time window out of the X time windows comprises that the physical-cell identifier to which a transmitter of the first reference signal belongs is used for determining the first time window out of the X time windows.

In one embodiment, the phrase that at least one of a physical cell identifier to which a transmitter of the first reference signal belongs, a position of frequency-domain resources occupied by the first reference signal in frequency domain or a position of the first time interval in time domain is used for determining the first time window out of the X time windows comprises that a position of the frequency-domain resources occupied by the first reference signal in frequency domain is used for determining the first time window out of the X time windows.

In one embodiment, the phrase that at least one of a physical cell identifier to which a transmitter of the first reference signal belongs, a position of frequency-domain resources occupied by the first reference signal in frequency domain or a position of the first time interval in time domain is used for determining the first time window out of the X time windows comprises that a position of the first time interval in time domain is used for determining the first time window out of the X time windows.

In one embodiment, the phrase that at least one of a physical cell identifier to which a transmitter of the first reference signal belongs, a position of frequency-domain resources occupied by the first reference signal in frequency domain or a position of the first time interval in time domain is used for determining the first time window out of the X time windows comprises that a physical-cell identifier to which a transmitter of the first reference signal belongs and a position of frequency-domain resources occupied by the first reference signal in frequency domain are used for determining the first time window out of the X time windows.

In one embodiment, the phrase that at least one of a physical cell identifier to which a transmitter of the first reference signal belongs, a position of frequency-domain resources occupied by the first reference signal in frequency domain or a position of the first time interval in time domain is used for determining the first time window out of the X time windows comprises that a position of the frequency-domain resources occupied by the first reference signal in frequency domain and a position of the first time interval in time domain are used for determining the first time window out of the X time windows.

In one embodiment, the phrase that at least one of a physical cell identifier to which a transmitter of the first reference signal belongs, a position of frequency-domain resources occupied by the first reference signal in frequency domain or a position of the first time interval in time domain is used for determining the first time window out of the X time windows comprises that a physical-cell identifier to which a transmitter of the first reference signal belongs and a position of the first time interval in time domain are used for determining the first time window out of the X time windows;

In one embodiment, the phrase that at least one of a physical cell identifier to which a transmitter of the first reference signal belongs, a position of frequency-domain resources occupied by the first reference signal in frequency domain or a position of the first time interval in time domain is used for determining the first time window out of the X time windows comprises that a physical-cell identifier to which a transmitter of the first reference signal belongs, a position of frequency-domain resources occupied by the first reference signal in frequency domain and a position of the first time interval in time domain are used for determining the first time window out of the X time windows;

In one embodiment, a physical-cell identifier to which a transmitter of the first reference signal belongs is a Physical Cell ID (PCID) of a physical cell to which a transmitter of the first reference signal belongs.

In one embodiment, a physical-cell identifier to which a transmitter of the first reference signal belongs is a round-down value of a quotient that a PCID of a physical cell to which a transmitter of the first reference signal belongs divided by 6.

In one embodiment, a position of frequency-domain resources occupied by the first reference signal in frequency domain refers to a position of a carrier to which frequency-domain resources occupied by the first reference signal belongs in frequency domain.

In one embodiment, a position of frequency-domain resources occupied by the first reference signal in frequency domain refers to an index of a carrier to which frequency-domain resources occupied by the first reference signal belongs.

In one embodiment, a position of frequency-domain resources occupied by the first reference signal in frequency domain refers to a number of a band to which frequency-domain resources occupied by the first reference signal belongs.

In one embodiment, a position of frequency-domain resources occupied by the first reference signal in frequency domain refers to an index of a carrier to which frequency-domain resources occupied by the first reference signal belongs, the index of the carrier is configured by network.

In one embodiment, a position of the first time interval in time domain comprises a position of an initial subframe comprised in the first time interval in time domain.

In one embodiment, a position of the first time interval in time domain comprises a position of an ending subframe comprised in the first time interval in time domain.

In one embodiment, a position of the first time interval in time domain comprises a frame number of an initial radio frame comprised in the first time interval.

In one embodiment, a position of the first time interval in time domain comprises a frame number of an ending radio frame comprised in the first time interval.

In one embodiment, the first time interval is one of M time interval(s), the M time interval(s) occurs(occur) periodically, and a position of the first time interval in time domain refers to an index of the first time interval in the M time interval(s).

In one embodiment, the phrase that at least one of a physical cell identifier to which a transmitter of the first reference signal belongs, a position of frequency-domain resources occupied by the first reference signal in frequency domain or a position of the first time interval in time domain is used for determining the first time window out of the X time windows comprises that at least one of a physical cell identifier to which a transmitter of the first reference signal belongs, a position of frequency-domain resources occupied by the first reference signal in frequency domain or a position of the first time interval in time domain is used for determining the first time window out of the X time windows according to a mapping relation.

In one embodiment, the phrase that at least one of a physical cell identifier to which a transmitter of the first reference signal belongs, a position of frequency-domain resources occupied by the first reference signal in frequency domain or a position of the first time interval in time domain is used for determining the first time window out of the X time windows comprises that at least one of a physical cell identifier to which a transmitter of the first reference signal belongs, a position of frequency-domain resources occupied by the first reference signal in frequency domain or a position of the first time interval in time domain is used for determining the first time window out of the X time windows according to a functional relation.

In one embodiment, the phrase that at least one of a physical cell identifier to which a transmitter of the first reference signal belongs, a position of frequency-domain resources occupied by the first reference signal in frequency domain or a position of the first time interval in time domain is used for determining the first time window out of the X time windows comprises that at least one of a physical cell identifier to which a transmitter of the first reference signal belongs, a position of frequency-domain resources occupied by the first reference signal in frequency domain or a position of the first time interval in time domain is used for determining the first time window out of the X time windows according to a mapping table.

In one embodiment, the air interface is wireless.

In one embodiment, the air interface comprises a wireless channel.

In one embodiment, the air interface is an interface between a second-type communication node and the first-type communication node.

In one embodiment, the air interface is a Uu interface.

Embodiment 2

Figure 2:
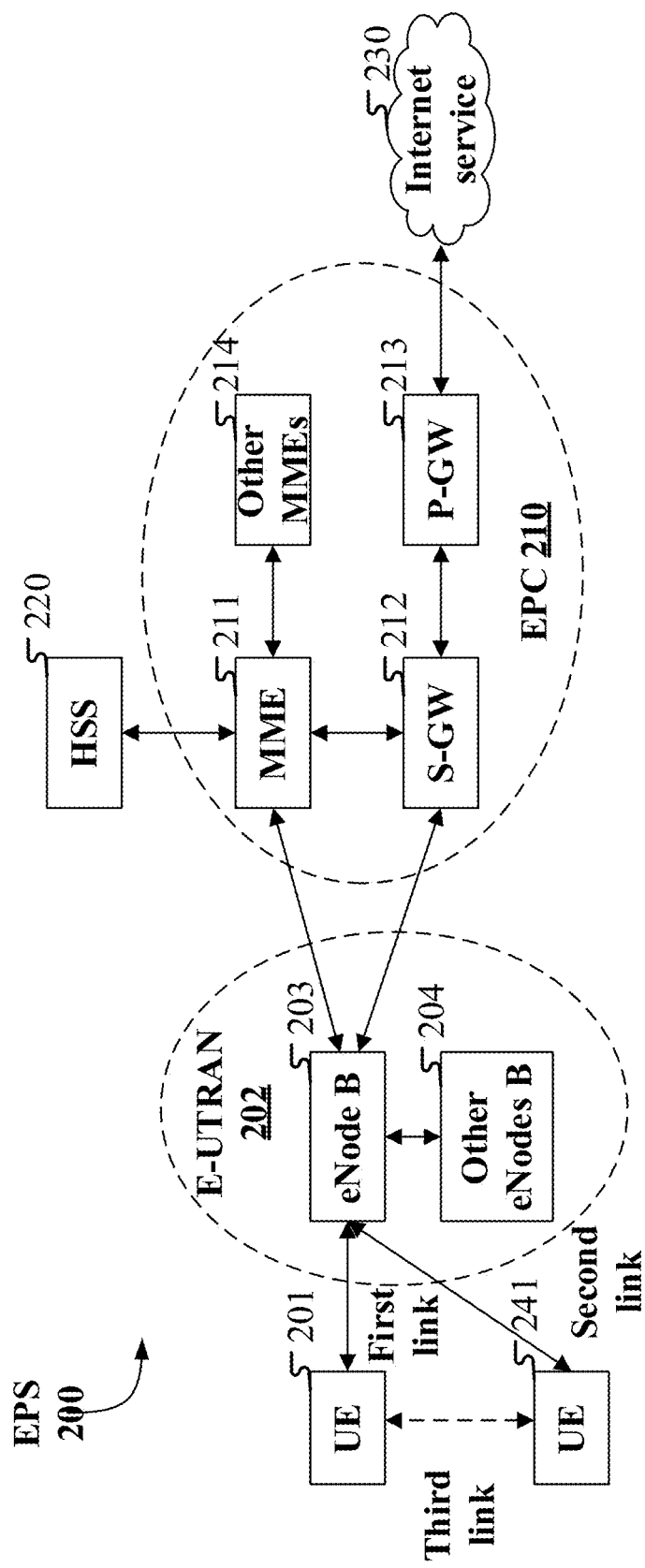
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 is a diagram illustrating a network architecture 200 of Long-Term Evolution (LTE), Long-Term Evolution Advanced (LTE-A) and future 5G systems. The LTE network architecture 200 may be called an Evolved Packet System (EPS) 200. The EPS 200 may comprise one or more UEs 201, an E-UTRAN 202, an Evolved Packet Core (EPC) 210, a Home Subscriber Server (HSS) 220 and an Internet Service 230. Herein, UMTS refers to Universal Mobile Telecommunications System. The EPS 200 may be interconnected with other access networks. For simple description, the entities/interfaces are not shown. As shown in FIG. 2, the EPS provides packet switching services. Those skilled in the art will find it easy to understand that various concepts presented throughout the present disclosure can be extended to networks providing circuit switching services. The E-UTRAN comprises an evolved node B (eNB) 203 and other eNBs 204. The eNB 203 provides UE 201-oriented user plane and control plane protocol terminations. The eNB 203 may be connected to other eNBs 204 via an X2 interface (for example, backhaul). The eNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The eNB 203 provides an access point of the EPC 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrow-band IoT equipment, machine-type communication equipment, land vehicles, automobiles, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, an IoT device, a client or some other appropriate terms. The eNB 203 is connected with the EPC 210 via an S1 interface. The EPC 210 comprises a Mobility Management Entity (MME) 211, other MMES 214, a Service Gateway (S-GW) 212 and a Packet Date Network Gateway (P-GW) 213. The MME 211 is a control node for processing a signaling between the UE 201 and the EPC 210. Generally, the MME 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first-type communication node in the present disclosure.

In one embodiment, the UE 201 supports transmissions of NRSs on non-anchor carriers.

In one embodiment, the UE 201 supports features of NB-IoT.

In one embodiment, the gNB 203 corresponds to the second-type communication node in the present disclosure.

In one embodiment, the gNB 203 supports transmissions of NRSs on non-anchor carriers.

In one embodiment, the gNB 203 supports features of NB-IoT.

Embodiment 3

Figure 3:
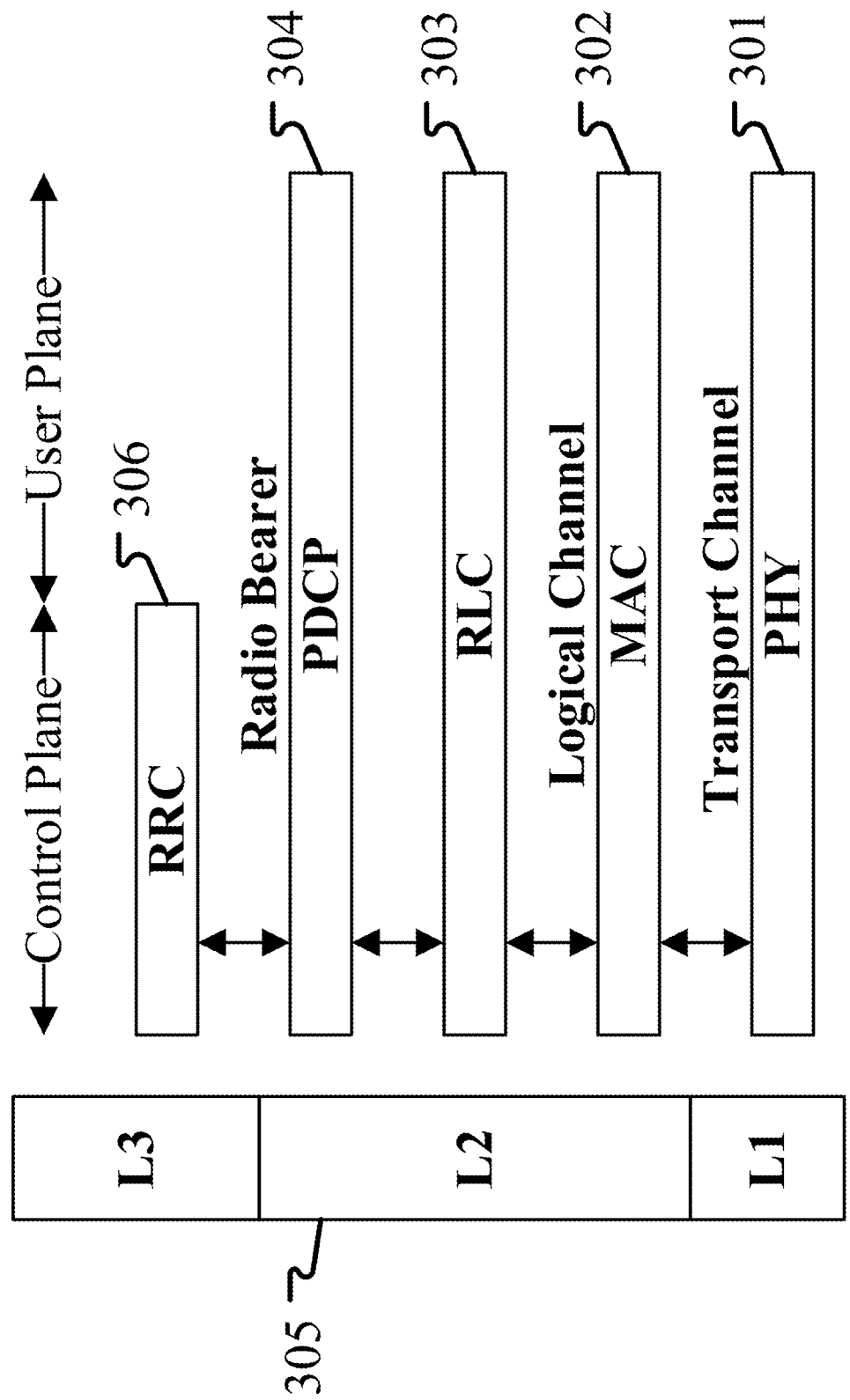
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane and a control plane. In FIG. 3, the radio protocol architecture for a first-type communication node (UE) and a second-type communication node (gNB, eNB or a satellite or an aircraft in NTN) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first-type communication node and the second-type communication node via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the second-type communication node of the network side. Although not described in FIG. 3, the first-type communication node may comprise several higher layers above the L2 305, such as a network layer (e.g., IP layer) terminated at a P-GW of the network side and an application layer terminated at the other side of the connection (e.g., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead, provides security by encrypting a packet, and provides support for handover of first-type communication nodes between second-type communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first-type communication nodes various radio resources (e.g., resource block) in a cell. The MAC sublayer 302 is also in charge of HARQ operation. In the control plane, the radio protocol architecture of the first-type communication node and the second-type communication node is almost the same as the radio protocol architecture on the PHY 301 and the L2 305, but there is no header compression for the control plane. The control plane also comprises an RRC sublayer 306 in the layer 3 (L3). The RRC sublayer 306 is responsible for obtaining radio resources (i.e., radio bearer) and configuring the lower layer using an RRC signaling between the second-type communication node and the first-type communication node.

In one embodiment, the radio protocol architecture in FIG. 3 is applicable to the first-type communication node in the present disclosure.

In one embodiment, the radio protocol architecture in FIG. 3 is applicable to the second-type communication node in the present disclosure.

In one embodiment, the first information in the present disclosure is generated by the RRC 306.

In one embodiment, the first information in the present disclosure is generated by the MAC 302.

In one embodiment, the first information in the present disclosure is generated by the PHY 301.

In one embodiment, the first reference signal in the present disclosure is generated by the PHY 301.

In one embodiment, the second information in the present disclosure is generated by the RRC 306.

In one embodiment, the second information in the present disclosure is generated by the MAC 302.

In one embodiment, the second information in the present disclosure is generated by the PHY 301.

In one embodiment, the third information in the present disclosure is generated by the RRC 306.

In one embodiment, the third information in the present disclosure is generated by the MAC 302.

In one embodiment, the third information in the present disclosure is generated by the PHY 301.

Embodiment 4

Figure 4:
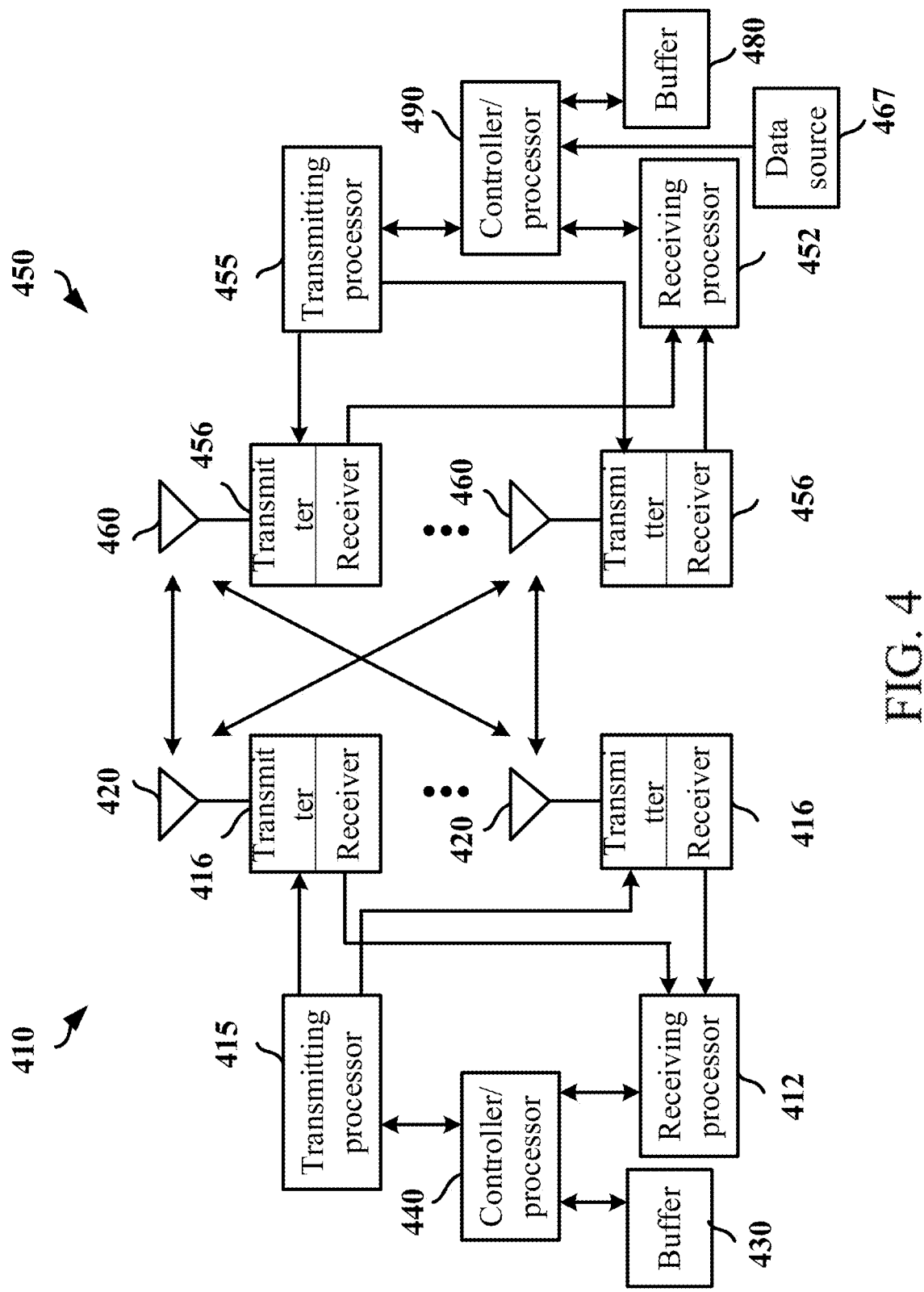
FIG. 4 illustrates a schematic diagram of a base station and a UE according to one embodiment of the present disclosure.

Embodiment 4 illustrates a schematic diagram of a first-type communication node and a second-type communication node in the present disclosure, as shown in FIG. 4.

The first-type communication node (450) comprises a controller/processor 490, a memory 480, a receiving processor 452, a transmitter/receiver 456, a transmitting processor 455 and a data source 467, wherein the transmitter/receiver 456 comprises an antenna 460. A higher layer packet is provided to the controller/processor 490 by the data source 467, the controller/processor 490 provides header compression, encryption, packet segmentation and reordering, as well as multiplexing and demultiplexing between a logical channel and a transport channel so as to implement the L2 layer protocols used for the user plane and the control plane; the higher layer packet may comprise data or control information, such as a DL-SCH and a UL-SCH. The transmitting processor 455 performs various signal transmitting processing functions used for the L1 layer (that is, PHY), including coding, interleaving, scrambling, modulation, power control/allocation, precoding and physical layer control signaling generation. The receiving processor 452 performs various signal receiving processing functions used for the L1 layer (that is, PHY), including decoding, deinterleaving, descrambling, demodulating, de-precoding and physical layer control signaling extraction. The transmitter 456 is configured to convert a baseband signal provided by the transmitting processor 455 into a radio frequency (RF) signal to be transmitted via the antenna 460. The receiver 456 converts the RF signal received via the antenna 460 into a baseband signal and provides the baseband signal to the receiving processor 452.

The second-type communication node (410) may comprise a controller/processor 440, a memory 430, a receiving processor 412, a transmitter/receiver 416 and a transmitting processor 415, wherein the transmitter/receiver 416 comprises an antenna 420. A higher layer packet is provided to the controller/processor 440, the controller/processor 440 provides header compression and decompression, encryption and decoding, packet segmentation and reordering, as well as a multiplexing and demultiplexing between a logical channel and a transport channel so as to implement the L2 layer protocols used for the user plane and the control plane. The higher layer packet may comprise data or control information, such as DL-SCH or UL-SCH. The transmitting processor 415 provides various signal transmitting processing functions used for the L1 layer (that is, PHY), including coding, interleaving, scrambling, modulating, power control/allocation, precoding and physical layer control signaling (including synchronization signal and reference signal) generation. The receiving processor 412 provides various signaling receiving processing functions used for the L1 layer (i.e., PHY), including decoding, deinterleaving, descrambling, demodulating, de-precoding and physical layer signaling extraction. The transmitter 416 is configured to convert a baseband signal provided by the transmitting processor 415 into a radio frequency (RF) signal to be transmitted via the antenna 420. The receiver 416 converts the RF signal received via the antenna 420 into a baseband signal and provides the baseband signal to the receiving processor 412.

In Downlink (DL) transmission, a higher layer packet, as carried by first information, second information and third information in the present disclosure, is provided to the controller/processor 440. The controller/processor 440 implements functions of L2/L3 layer. In DL transmission, the controller/processor 440 provides header compression, encryption, packet segmentation and reordering and multiplexing between a logical channel and a transport channel, as well as radio resource allocation of the first-type communication node 450 based on varied priorities. The controller/processor 440 is also in charge of HARQ operation, retransmission of a lost packet, and a signaling to the first-type communication node 450, for instance, the first information, the second information and the third information in the present disclosure are all generated in the controller/processor 440. The transmitting processor 415 provides various signal-processing functions for the L1 layer (that is, PHY), including coding, interleaving, scrambling, modulating, power control/allocation, precoding and generation of physical-layer control signaling. The generation of a first reference signal in the present disclosure is completed in the transmitting processor 415. Modulation symbols are divided into parallel streams and each stream is mapped onto a corresponding multicarrier subcarrier and/or a multicarrier symbol, which is later mapped from the transmitting processor 415 to the antenna 420 via the transmitter 416 in the form of a radio frequency signal. Corresponding channels of the first information, the second information and the third information of the present disclosure on physical layer are mapped from the transmitting processor 415 to target radio resources and then mapped from the transmitter 416 to the antenna 420 to be transmitted in the form of RF signals. At the receiving side, each receiver 456 receives an RF signal via a corresponding antenna 460, each receiver 456 recovers baseband information modulated onto an RF carrier and provides the baseband information to the receiving processor 452. The receiving processor 452 provides various signal receiving functions for the L1 layer. The functions include receiving the physical-layer signals of first reference signal, the first information, the second information and the third information in the present disclosure. Multicarrier symbols in multicarrier symbol streams are demodulated based on varied modulation schemes (i.e., BPSCK, QPSK), and are then de-scrambled, decoded and de-interleaved to recover data or control signal transmitted by the second-type communication node 410 on a physical channel. And after that the data and control signal are provided to the controller/processor 490. The controller/processor 490 is in charge of the L2/L3 layer functionality. The controller/processor 490 interprets the first information, second information and third information in the present disclosure. The controller/processor 490 may be associated with the memory 480 that stores program code and data. The memory 480 may be called a computer readable medium.

In one embodiment, the first-type communication node 450 comprises at least one processor and at least one memory. The at least one memory comprises computer program codes; the at least one memory and the computer program codes are configured to be used in collaboration with the at least one processor, the first-type communication node 450 at least receives first information on a first carrier, the first information being used for determining a first time interval; and receives a first reference signal in a first time window on a second carrier; herein, the first time window is one of X time windows; each of the X time windows belongs to the first time interval, X being a positive integer greater than 1; at least one of a physical cell identifier to which a transmitter of the first reference signal belongs, a position of frequency-domain resources occupied by the first reference signal in frequency domain or a position of the first time interval in time domain is used for determining the first time window out of the X time windows; the first carrier and the second carrier are two different carriers; the first information is transmitted via an air interface.

In one embodiment, the first-type communication node 450 comprises a memory that stores a computer readable instruction program. The computer readable instruction program generates an action when executed by at least one processor. The action includes: receiving first information on a first carrier, the first information being used for determining a first time interval; and receiving a first reference signal in a first time window on a second carrier; herein, the first time window is one of X time windows; each of the X time windows belongs to the first time interval, X being a positive integer greater than 1; at least one of a physical cell identifier to which a transmitter of the first reference signal belongs, a position of frequency-domain resources occupied by the first reference signal in frequency domain or a position of the first time interval in time domain is used for determining the first time window out of the X time windows; the first carrier and the second carrier are two different carriers; the first information is transmitted via an air interface.

In one embodiment, the second-type communication node 410 comprises at least one processor and at least one memory. The at least one memory comprises computer program codes; the at least one memory and the computer program codes are configured to be used in collaboration with the at least one processor. The second-type communication node 410 at least: transmits first information on a first carrier, the first information being used for determining a first time interval; and transmits a first reference signal in a first time window on a second carrier; herein, the first time window is one of X time windows; each of the X time windows belongs to the first time interval, X being a positive integer greater than 1; at least one of a physical cell identifier to which a transmitter of the first reference signal belongs, a position of frequency-domain resources occupied by the first reference signal in frequency domain or a position of the first time interval in time domain is used for determining the first time window out of the X time windows; the first carrier and the second carrier are two different carriers; the first information is transmitted via an air interface.

In one embodiment, the second-type communication node 410 comprises a memory that stores a computer readable instruction program. The computer readable instruction program generates an action when executed by at least one processor. The action includes: transmitting first information on a first carrier, the first information being used for determining a first time interval; and transmitting a first reference signal in a first time window on a second carrier; herein, the first time window is one of X time windows; each of the X time windows belongs to the first time interval, X being a positive integer greater than 1; at least one of a physical cell identifier to which a transmitter of the first reference signal belongs, a position of frequency-domain resources occupied by the first reference signal in frequency domain or a position of the first time interval in time domain is used for determining the first time window out of the X time windows; the first carrier and the second carrier are two different carriers; the first information is transmitted via an air interface.

In one embodiment, the receiver 456 (including the antenna 460), the receiving processor 452 and the controller/processor 490 are used for receiving the first information in the present disclosure.

In one embodiment, the receiver 456 (including the antenna 460) and the receiving processor 452 are used for receiving the first reference signal in the present disclosure.

In one embodiment, the receiver 456 (including the antenna 460), the receiving processor 452 and the controller/processor 490 are used for receiving the second information in the present disclosure.

In one embodiment, the receiver 456 (including the antenna 460), the receiving processor 452 and the controller/processor 490 are used for receiving the third information in the present disclosure.

In one embodiment, the transmitter 416 (including the antenna 420), the transmitting processor 415 and the controller/processor 440 are used for transmitting the first information in the present disclosure.

In one embodiment, the transmitter 416 (including the antenna 420) and the transmitting processor 415 are used for transmitting the first reference signal in the present disclosure.

In one embodiment, the transmitter 416 (including the antenna 420), the transmitting processor 415 and the controller/processor 440 are used for transmitting the second information in the present disclosure.

In one embodiment, the transmitter 416 (including the antenna 420), the transmitting processor 415 and the controller/processor 440 are used for transmitting the third information in the present disclosure.

Embodiment 5

Figure 5:
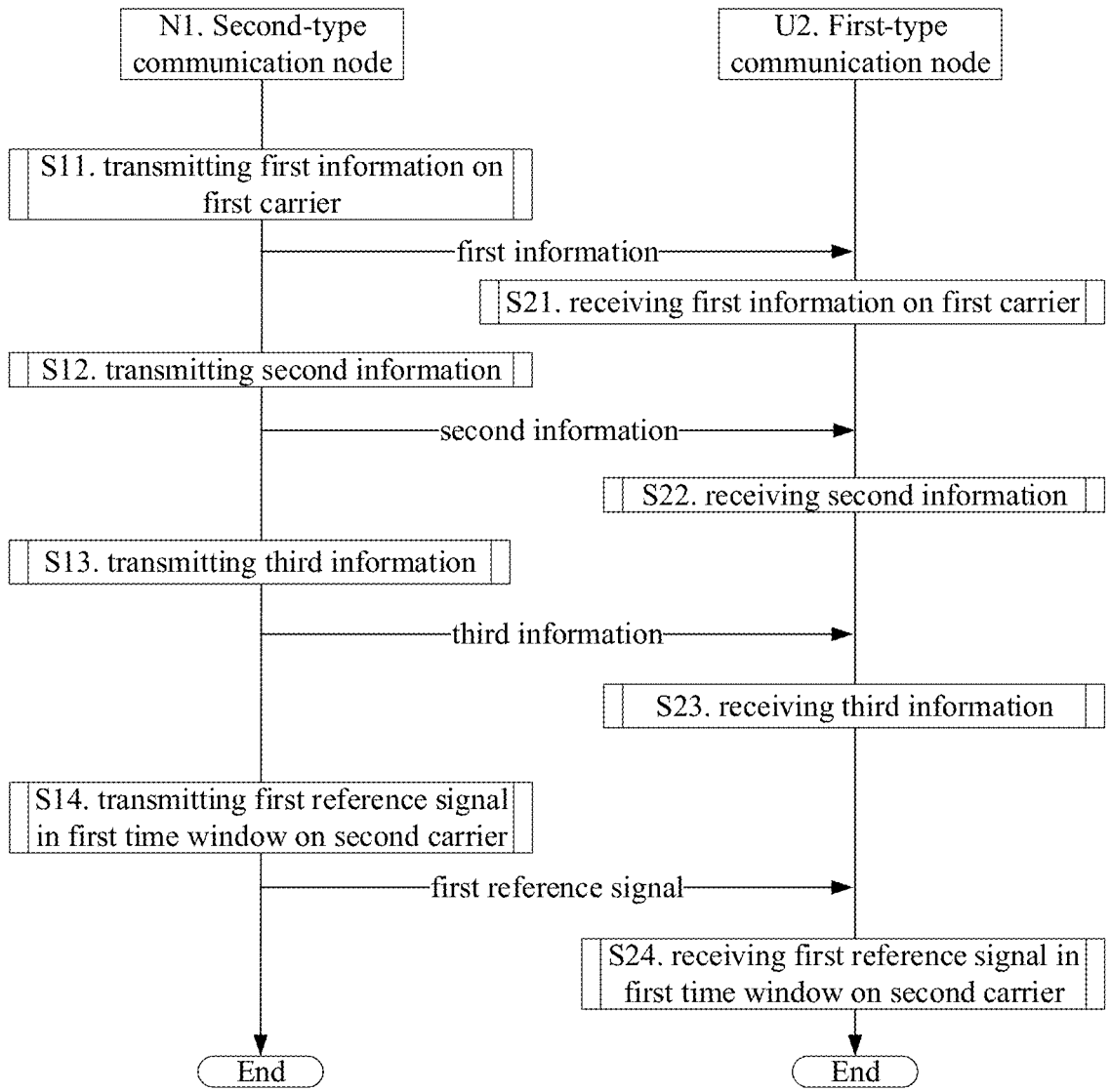
FIG. 5 illustrates a flowchart of radio signal transmission according to one embodiment of the present disclosure.

Embodiment 5 illustrates a flowchart of radio signal transmission according to one embodiment in the present disclosure, as shown in FIG. 5. In FIG. 5, a second-type communication node N1 is a maintenance base station of a serving cell of a first-type communication node U2.

The second-type communication node N1 transmits first information on a first carrier in step S11, transmits second information in step S12, transmits third information in step S13, and transmits a first reference signal in a first time window on a second carrier in step S14.

The first-type communication node U2 receives first information on a first carrier in step S21, receives second information in step S22, receives third information in step S23, and receives a first reference signal in a first time window on a second carrier in step S24.

In Embodiment 5, the first information is used for determining a first time interval; the first time window is one of X time windows; each of the X time windows belongs to the first time interval, X being a positive integer greater than 1; at least one of a physical cell identifier to which a transmitter of the first reference signal belongs, a position of frequency-domain resources occupied by the first reference signal in frequency domain or a position of the first time interval in time domain is used for determining the first time window out of the X time windows; the first carrier and the second carrier are two different carriers; the first information is transmitted via an air interface; the second information is used for indicating a first time length, the first time length is equal to a time length of the first time interval multiplied by an integer power of 2, the first time length is used for determining the X time windows out of the first time interval, and the second information is transmitted via the air interface; the third information is used for determining a time length of the first time window, and the third information is transmitted via the air interface.

In one embodiment, each of the X time windows comprises a positive integer number of subframe(s), each of the X time windows has a subframe reserved for transmitting a scheduling message for paging, and a position of an initial subframe reserved for transmitting a scheduling message for paging is fixed within a time window to which it belongs, for each of the X time windows.

In one embodiment, a first time sub-window belongs to the first time window, a time length of the first time sub-window is no longer than a time length of the first time window, and the first time sub-window comprises time-domain resources occupied by the first reference signal; a position of the first time sub-window in the first time window is pre-defined, or a position of the first time sub-window in the first time window is configured, or a position of the first time sub-window in the first time window is related to at least one of a physical-cell identifier to which a transmitter of the first reference signal belongs, a position of frequency-domain resources occupied by the first reference signal in frequency domain or a position of the first time interval in time domain.

In one embodiment, the X time windows are indexed in order, at least one of a physical-cell identifier to which a transmitter of the first reference signal, a position of frequency-domain resources occupied by the first reference signal in frequency domain or a position of the first time interval in time domain is used for determining a first parameter, the first parameter is a non-negative integer, and a remainder of the first parameter modulo the X is used for determining an index of the first time window.

In one embodiment, the second information is transmitted via a higher-layer signaling.

In one embodiment, the second information is transmitted via a physical-layer signaling.

In one embodiment, the second information comprises all or part of a higher-layer signaling.

In one embodiment, the second information comprises all or part of a physical-layer signaling.

In one embodiment, the second information is transmitted through a DL-SCH.

In one embodiment, the second information is transmitted through a PDSCH.

In one embodiment, the second information comprises all or part of IEs in an RRC signaling.

In one embodiment, the second information comprises all or part of fields in an IE in an RRC signaling.

In one embodiment, the second information is transmitted through an NPDSCH.

In one embodiment, the second information comprises one or more fields in an SIB.

In one embodiment, the second information is Broadcast.

In one embodiment, the second information is Cell-Specific.

In one embodiment, the first information and the second information are transmitted via a same signaling.

In one embodiment, the first information and the second information are transmitted via two different signalings.

In one embodiment, the first information and the second information are carried by two different IEs in a same RRC signaling.

In one embodiment, the first information and the second information are carried by two different fields in a same IE in a same RRC signaling.

In one embodiment, the second information being used for indicating the first time length means that the second information directly indicates the first time length.

In one embodiment, the second information being used for indicating the first time length means that the second information indirectly indicates the first time length.

In one embodiment, the second information being used for indicating the first time length means that the second information explicitly indicates the first time length.

In one embodiment, the second information being used for indicating the first time length means that the second information implicitly indicates the first time length.

In one embodiment, the second information comprises "nB-r13" in "PCCH-Config-NB-r13" in "RadioResourceConfigCommonSIB-NB-r13" in 3GPP TS36.331 (V15.2.0), section 6. 7. 3. 2.

In one embodiment, the third information is transmitted via a higher-layer signaling.

In one embodiment, the third information is transmitted via a physical-layer signaling.

In one embodiment, the third information comprises all or part of a higher-layer signaling.

In one embodiment, the third information comprises all or part of a physical-layer signaling.

In one embodiment, the third information is transmitted through a DL-SCH.

In one embodiment, the third information is transmitted through a PDSCH.

In one embodiment, the third information comprises all or part of IEs in an RRC signaling.

In one embodiment, the third information comprises all or part of fields in an IE in an RRC signaling.

In one embodiment, the third information is transmitted through an NPDSCH.

In one embodiment, the third information comprises one or more fields in an SIB.

In one embodiment, the third information is broadcast.

In one embodiment, the third information is Cell-Specific.

In one embodiment, the third information and the second information are transmitted via a same signaling.

In one embodiment, the third information and the second information are transmitted via two different signalings.

In one embodiment, the third information and the second information are carried by two different IEs in a same RRC signaling.

In one embodiment, the third information and the second information are carried by two different fields in a same IE in a same RRC signaling.

In one embodiment, the third information being used for determining a time length of the first time window comprises that the third information is used by the first-type communication node for determining a time length of the first time window.

In one embodiment, the third information being used for determining a time length of the first time window comprises that the third information directly indicates a time length of the first time window.

In one embodiment, the third information being used for determining a time length of the first time window comprises that the third information indirectly indicates a time length of the first time window.

In one embodiment, the third information being used for determining a time length of the first time window comprises that the third information explicitly indicates a time length of the first time window.

In one embodiment, the third information being used for determining a time length of the first time window comprises that the third information implicitly indicates a time length of the first time window.

In one embodiment, the third information is used for indicating Rmax of Type-1 CSS in 3GPP TS36.213 (V15.2.0), section 16.6, and a time length of the first time window is equal to the Rmax plus 14 milliseconds.

In one embodiment, the third information is used for indicating Rmax of Type-1 CSS in 3GPP TS36.213 (V15.2.0), section 16.6, and a time length of the first time window is equal to the Rmax plus 10 milliseconds.

In one embodiment, the third information comprises "npdcch-NumRepetitionPaging-r13" in "PCCH-Config- NB-r13" in "RadioResourceConfigCommonSIB-NB-r13" in 3GPP TS36.331 (V15.2.0), section 6. 7. 3. 2.

In one embodiment, the third information comprises "npdcch-NumRepetitionPaging-r13" in "PCCH-Config-NB-r13" in "RadioResourceConfigCommonSIB-NB-r13" in 3GPP TS36.331 (V15.2.0), section 6. 7. 3. 2, and a time length of the first time window is equal to a value indicated by the "npdcch-NumRepetitionPaging-r13" plus 10 ms.

In one embodiment, the third information comprises "npdcch-NumRepetitionPaging-r13" in "PCCH-Config-NB-r13" in "RadioResourceConfigCommonSIB-NB-r13" in 3GPP TS36.331 (V15.2.0), section 6. 7. 3. 2, and a time length of the first time window is equal to a value indicated by the "npdcch-NumRepetitionPaging-r13" plus 14 ms.

Embodiment 6

Figure 6:
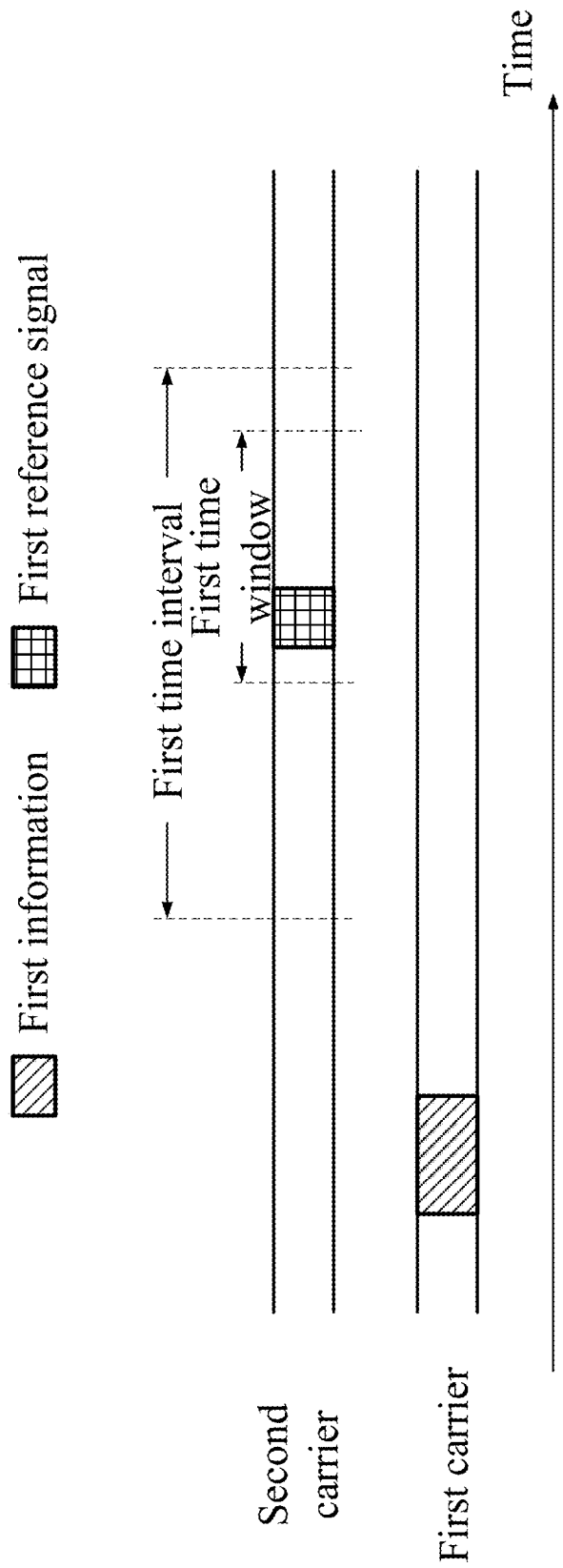
FIG. 6 illustrates a schematic diagram of a relation between first information and a first reference signal according to one embodiment of the present disclosure.

Embodiment 6 illustrates a schematic diagram of a relation between first information and a first reference signal according to one embodiment of the present disclosure, as shown in FIG. 6. In FIG. 6, the horizontal axis represents time, the slash-filled box represents first information, and the reticle-filled box represents a first reference signal.

In Embodiment 6, first information is transmitted on a first carrier, and the first information is used for determining a first time interval; a first reference signal is transmitted in a first time window on a second carrier; the first time window is one of X time windows; each of the X time windows belongs to the first time interval, X being a positive integer greater than 1; at least one of a physical cell identifier to which a transmitter of the first reference signal belongs, a position of frequency-domain resources occupied by the first reference signal in frequency domain or a position of the first time interval in time domain is used for determining the first time window out of the X time windows; the first carrier and the second carrier are two different carriers; the first information is transmitted via an air interface.

In one embodiment, the first carrier is an NB-IoT Anchor Carrier.

In one embodiment, an index of the first carrier is 0.

In one embodiment, the first carrier is a carrier for transmitting an NB-IoT synchronization signal and a system message.

In one embodiment, the second carrier is an NB-IoT Non-Anchor Carrier.

In one embodiment, an index value of the second carrier is greater than 0.

In one embodiment, the second carrier cannot transmit an NB-IoT synchronization signal and a system message.

In one embodiment, the first carrier is a carrier that an NB-IoT works in Standalone Mode.

In one embodiment, the first carrier is a carrier that an NB-IoT works in Guard-band Mode.

In one embodiment, the first carrier is a carrier that an NB-IoT works in In-band Mode.

In one embodiment, the second carrier is a carrier that an NB-IoT works in Standalone Mode.

In one embodiment, the second carrier is a carrier that an NB-IoT works in Guard-band Mode.

In one embodiment, the second carrier is a carrier that an NB-IoT works in In-band Mode.

Embodiment 7

Figure 7:
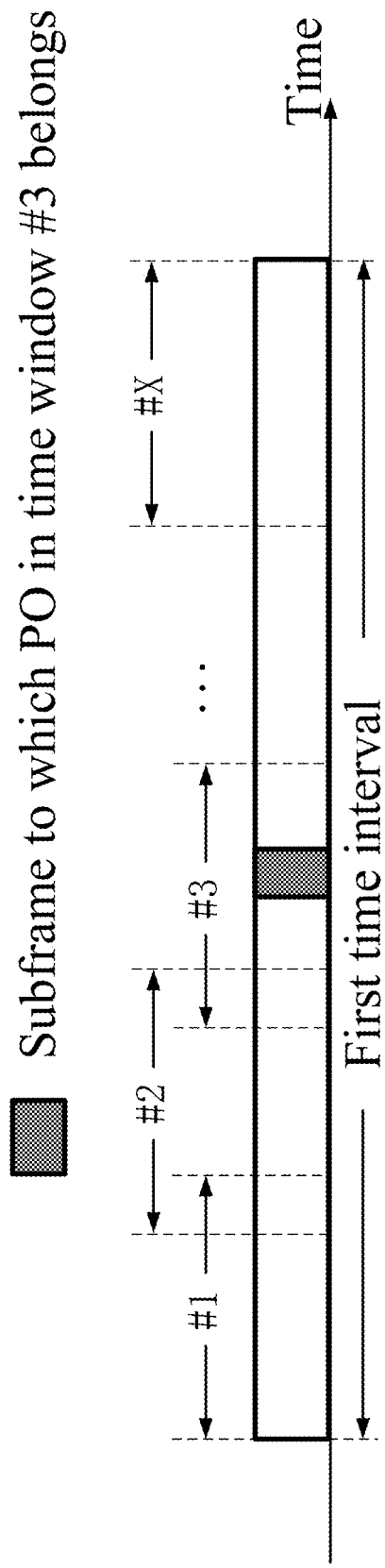
FIG. 7 illustrates a schematic diagram of X time windows according to one embodiment of the present disclosure.

Embodiment 7 illustrates a schematic diagram of X time windows according to one embodiment of the present disclosure, as shown in FIG. 7. In FIG. 7, the horizontal axis represents time, time windows marked by #1, #2, #3, . . . , #X represent X time windows, and the grey box represents a subframe to which PO in time window #3 belongs.

In Embodiment 7, each of the X time windows in the present disclosure comprises a positive integer number of subframe(s), each of the X time windows has a subframe reserved for transmitting a scheduling message for paging, and a position of an initial subframe reserved for transmitting a scheduling message for paging is fixed within a time window to which it belongs, for each of the X time windows.

In one embodiment, the phrase that each of the X time windows has a subframe reserved for transmitting a scheduling message for paging means that each of the X time windows has a subframe that can be used for transmitting a scheduling message for paging.

In one embodiment, a subframe reserved for transmitting a scheduling message for paging comprised in each of the X time windows is used for transmitting a scheduling message for paging.

In one embodiment, a subframe reserved for transmitting a scheduling message for paging comprised in each of the X time windows can be used for transmitting a message other than a scheduling message for paging.

In one embodiment, the scheduling message for paging comprises an NPDCCH used for scheduling paging-related messages.

In one embodiment, the scheduling message for paging comprises DCI used for scheduling a paging channel (PCH).

In one embodiment, the scheduling message for paging is transmitted through an NPDCCH scrambled by a Paging Radio Network Temporary Identity (P-RNTI).

In one embodiment, the scheduling message for paging comprises a system messages update indication message.

In one embodiment, the scheduling message for paging comprises an earthquake and tsunami warning message.

In one embodiment, the scheduling message for paging comprises a system messages update direct indication.

In one embodiment, the phrase that each of the X time windows has a subframe reserved for transmitting a scheduling message for paging means that each of the X time windows has a candidate subframe reserved for transmitting an NPDCCH scrambled by a Paging Radio Network Temporary Identity (P-RNTI).

In one embodiment, the phrase that each of the X time windows has a subframe reserved for transmitting a scheduling message for paging means that each of the X time windows has a candidate subframe that can be used for transmitting an NPDCCH scrambled by P-RNTI.

In one embodiment, the phrase that each of the X time windows has a subframe reserved for transmitting a scheduling message for paging means that each of the X time windows has a subframe for transmitting Type-1 CSS in 3GPP TS36.213 (V15.2.0), section 16. 6.

In one embodiment, the phrase that each of the X time windows has a subframe reserved for transmitting a scheduling message for paging means that each of the X time windows has a subframe of a PO.

In one embodiment, the phrase that a position of an initial subframe reserved for transmitting a scheduling message for paging within a time window to which it belongs for each of the X time windows comprises an arrangement order of an initial subframe reserved for transmitting a scheduling message for paging within a time window to which it belongs according to chronological order for each of the X time windows.

In one embodiment, the phrase that a position of an initial subframe reserved for transmitting a scheduling message for paging within a time window to which it belongs for each of the X time windows comprises an index of an initial subframe reserved for transmitting a scheduling message for paging within a time window to which it belongs according to chronological order for each of the X time windows.

In one embodiment, the phrase that a position of an initial subframe reserved for transmitting a scheduling message for paging is fixed within a time window to which it belongs for each of the X time windows means that a time interval length between an initial subframe reserved for transmitting a scheduling message for paging comprised in each of the X time windows and an initial subframe in a time window to which it belongs is fixed.

In one embodiment, the phrase that a position of an initial subframe reserved for transmitting a scheduling message for paging is fixed within a time window to which it belongs for each of the X time windows means that a time interval length between an initial time of an initial subframe reserved for transmitting a scheduling messages for paging comprised in each of the X time windows and an initial time of an initial subframe within a time window to which it belongs is equal to a length of 10 subframes.

In one embodiment, the phrase that a position of an initial subframe reserved for transmitting a scheduling message for paging is fixed within a time window to which it belongs for each of the X time windows means that a time interval length between an initial time of an initial subframe reserved for transmitting a scheduling message for paging comprised in each of the X time windows and an initial time of an initial subframe within a time window to which it belongs is equal to 10 ms.

In one embodiment, the phrase that a position of an initial subframe reserved for transmitting a scheduling message for paging is fixed within a time window to which it belongs for each of the X time windows means that an initial subframe reserved for transmitting a scheduling message for paging is an 11th subframe among subframes arranged according to chronological order within a time window to which it belongs for each of the X time windows.

Embodiment 8

Figure 8:
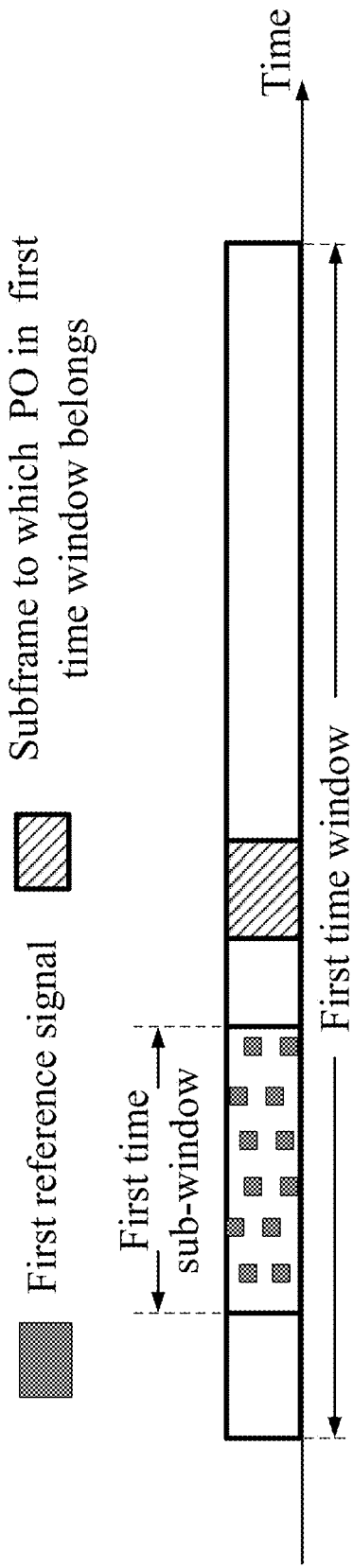
FIG. 8 illustrates a schematic diagram of a relation between a first time sub-window and a first time window according to one embodiment of the present disclosure.

Embodiment 8 illustrates a schematic diagram of a relation between a first time sub-window and a first time window according to one embodiment of the present disclosure, as shown in FIG. 8. In FIG. 8, the horizontal axis represents time, the grey box represents a first reference signal, and a slash-filled box represents a subframe to which a PO in a first time window belongs.

In Embodiment 8, the first time sub-window in the present disclosure belongs to the first time window, a time length of the first time sub-window is no longer than a time length of the first time window, and the first time sub-window comprises time-domain resources occupied by the first reference signal in the present disclosure; a position of the first time sub-window in the first time window is pre-defined, or a position of the first time sub-window in the first time window is configured, or a position of the first time sub-window in the first time window is related to at least one of a physical-cell identifier to which a transmitter of the first reference signal belongs, a position of frequency-domain resources occupied by the first reference signal in frequency domain or a position of the first time interval in time domain in the present disclosure.

In one embodiment, a time length of the first time sub-window is equal to a time length of the first time window.

In one embodiment, a time length of the first time sub-window is less than a time length of the first time window.

In one embodiment, only the first time sub-window in the first time window comprises time-domain resources occupied by the first reference signal.

In one embodiment, when a time length of the first time sub-window is less than a time length of the first time window, time-domain resources other than the first time sub-window in the first time window does not comprise time-domain resources occupied by the first reference signal.

In one embodiment, the first time sub-window comprises all subframes that comprise time-domain resources occupied by the first reference signal.

In one embodiment, the first time sub-window consists of all subframes that comprise time-domain resources occupied by the first reference signal.

In one embodiment, a position of the first time sub-window in the first time window refers to a time interval length between an initial time of the first time sub-window and an initial time of the first time window.

In one embodiment, a position of the first time sub-window in the first time window refers to a position of an initial subframe of the first time sub-window in the first time window.

In one embodiment, a position of the first time sub-window in the first time window refers to an arrangement position according to chronological order of an initial subframe of the first time sub-window in subframes comprised in the first time window.

In one embodiment, a position of the first time sub-window in the first time window refers to an index according to chronological order of an initial subframe of the first time sub-window in subframes comprised in the first time window.

In one embodiment, a position of the first time sub-window in the first time window being pre-defined refers to that a position of the first time sub-window in the first time window is fixed.

In one embodiment, the phrase that a position of the first time sub-window in the first time window is related to at least one of a physical-cell identifier to which a transmitter of the first reference signal belongs, a position of frequency-domain resources occupied by the first reference signal in frequency domain or a position of the first time interval in time domain comprises that at least one of a physical-cell identifier of a transmitter of the first reference signal, a position of frequency-domain resources occupied by the first reference signal in frequency domain or a position of the first time interval in time domain is used for determining a position of the first time sub-window in the first time window.

In one embodiment, the phrase that a position of the first time sub-window in the first time window is related to at least one of a physical-cell identifier to which a transmitter of the first reference signal belongs, a position of frequency-domain resources occupied by the first reference signal in frequency domain or a position of the first time interval in time domain comprises that a position of the first time sub-window in the first time window varies with the change of at least one of a physical-cell identifier to which a transmitter of the first reference signal belongs, a position of frequency-domain resources occupied by the first reference signal in frequency domain or a position of the first time interval in time domain.

In one embodiment, the phrase that a position of the first time sub-window in the first time window is related to at least one of a physical-cell identifier to which a transmitter of the first reference signal belongs, a position of frequency-domain resources occupied by the first reference signal in frequency domain or a position of the first time interval in time domain comprises that at least one of a physical-cell identifier of a transmitter of the first reference signal, a position of frequency-domain resources occupied by the first reference signal in frequency domain or a position of the first time interval in time domain is used for determining a position of the first time sub-window in the first time window based on a mapping relation.

In one embodiment, the phrase that a position of the first time sub-window in the first time window is related to at least one of a physical-cell identifier to which a transmitter of the first reference signal belongs, a position of frequency-domain resources occupied by the first reference signal in frequency domain or a position of the first time interval in time domain comprises that a position of the first time sub-window in the first time window is related to a physical-cell identifier to which a transmitter of the first reference signal belongs.

In one embodiment, the phrase that a position of the first time sub-window in the first time window is related to at least one of a physical-cell identifier to which a transmitter of the first reference signal belongs, a position of frequency-domain resources occupied by the first reference signal in frequency domain or a position of the first time interval in time domain comprises that a position of the first time sub-window in the first time window is related to a position of frequency-domain resources occupied by the first reference signal in frequency domain.

In one embodiment, the phrase that a position of the first time sub-window in the first time window is related to at least one of a physical-cell identifier to which a transmitter of the first reference signal belongs, a position of frequency-domain resources occupied by the first reference signal in frequency domain or a position of the first time interval in time domain comprises that a position of the first time sub-window in the first time window is related to a position of the first time interval in time domain.

In one embodiment, the phrase that a position of the first time sub-window in the first time window is related to at least one of a physical-cell identifier to which a transmitter of the first reference signal belongs, a position of frequency-domain resources occupied by the first reference signal in frequency domain or a position of the first time interval in time domain comprises that a position of the first time sub-window in the first time window is both related to a physical-cell identifier to which a transmitter of the first reference signal belongs and a position of frequency-domain resources occupied by the first reference signal in frequency domain.

In one embodiment, the phrase that a position of the first time sub-window in the first time window is related to at least one of a physical-cell identifier to which a transmitter of the first reference signal belongs, a position of frequency-domain resources occupied by the first reference signal in frequency domain or a position of the first time interval in time domain comprises that a position of the first time sub-window in the first time window is both related to a physical-cell identifier to which a transmitter of the first reference signal belongs and a position of the first time interval in time domain.

In one embodiment, the phrase that a position of the first time sub-window in the first time window is related to at least one of a physical-cell identifier to which a transmitter of the first reference signal belongs, a position of frequency-domain resources occupied by the first reference signal in frequency domain or a position of the first time interval in time domain comprises that a position of the first time sub-window in the first time window is both related to a position of frequency-domain resources occupied by the first reference signal in frequency domain and a position of the first time interval in time domain.

In one embodiment, the phrase that a position of the first time sub-window in the first time window is related to at least one of a physical-cell identifier to which a transmitter of the first reference signal belongs, a position of frequency-domain resources occupied by the first reference signal in frequency domain or a position of the first time interval in time domain comprises that a position of the first time sub-window in the first time window is related to a physical-cell identifier to which a transmitter of the first reference signal belongs, a position of frequency-domain resources occupied by the first reference signal in frequency domain and a position of the first time interval in time domain.

Embodiment 9

Embodiment 9 illustrates a schematic diagram of relations of a first time length and X time windows according to one embodiment of the present disclosure, as shown in FIG. 9. In FIG. 9, the first column represents a first time length, wherein T represents a time length of a first time interval, the second column represents radio frames to which initial subframes of X time windows belong, and the third column represents subframe number indexes (start from 0) of initial subframes of X time windows in radio frames to which they belong.

In Embodiment 9, the second information in the present disclosure is used for indicating a first time length, the first time length is equal to a time length of the first time interval multiplied by an integer power of 2 in the present disclosure, and the first time length is used for determining the X time windows in the present disclosure out of the first time interval.

In one embodiment, the first time length is equal to nB in 3GPP TS36.304 (V15.0.0), section 7.1.

In one embodiment, the first time length is equal to one of 4T, 2T, T, T/2, T/4, T/8, T/16, T/32, T/64, T/128, T/256, T/512, or T/1024, wherein T is equal to a time length of the first time interval.

In one embodiment, the first time length being used for determining the X time windows out of the first time interval comprises that the first time length is used for determining initial times of the X time windows out of the first time interval.

In one embodiment, the first time length being used for determining the X time windows out of the first time interval comprises that the first time length is used for determining initial subframes of the X time windows out of the first time interval.

In one embodiment, the first time length being used for determining the X time windows out of the first time interval comprises that the first time length is used for determining all (for all UEs) POs comprised in the first time interval out of the first time interval according to the method in 3GPP TS36.304 (v15.0.0), section 7. 1, and initial times of initial subframes of the X time windows are respectively 10 ms earlier than initial times of all PO subframes in the first time interval, X being equal to a number of all POs in the first time interval.

Embodiment 10

Figure 10:
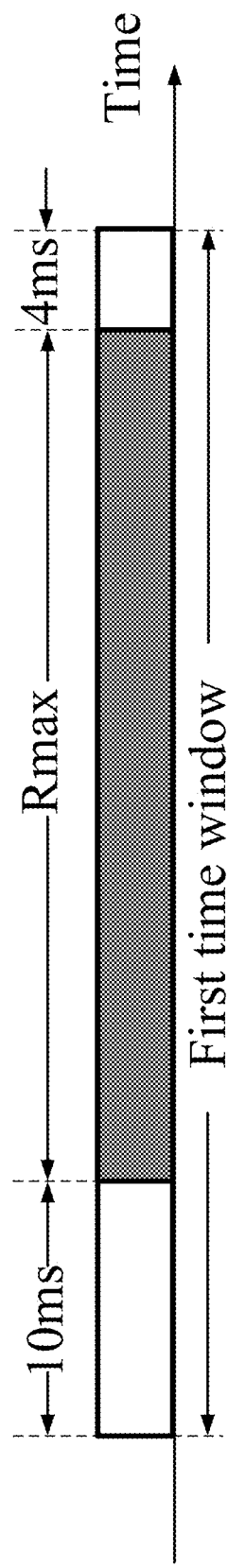
FIG. 10 illustrates a schematic diagram of a time length of a first time window according to one embodiment of the present disclosure.

Embodiment 10 illustrates a schematic diagram of relations of a first time length and X time windows according to one embodiment of the present disclosure, as shown in FIG. 10. In FIG. 10, the horizontal axis represents the time, and the grey box represents Rmax of scheduling a paging CSS. In Embodiment 10, the third information in the present disclosure is used for determining a time length of the first time window in the present disclosure.

In one embodiment, a time length of the first time sub-window in the present disclosure is related to a time length of the first time window.

In one embodiment, a time length of the first time sub-window in the present disclosure is positively related to a time length of the first time window.

In one embodiment, the third information comprises "npdcch-NumRepetitionPaging-r13" in "PCCH-Config-NB-r13" in "RadioResourceConfigCommonSIB-NB-r13" in 3GPP TS36.331 (V15.2.0), section 6. 7. 3. 2, and a time length of the first time sub-window in the present disclosure is related to a value indicated by the "npdcch-NumRepetitionPaging-r13".

In one embodiment, the third information comprises "npdcch-NumRepetitionPaging-r13" in "PCCH-Config-NB-r13" in "RadioResourceConfigCommonSIB-NB-r13" in 3GPP TS36.331 (V15.2.0), section 6. 7. 3. 2, and a time length of the first time sub-window in the present disclosure is positively related to a value indicated by the "npdcch-NumRepetitionPaging-r13".

Embodiment 11

Embodiment 11 illustrates a schematic diagram of a relation between a first parameter and a first time window according to one embodiment of the present disclosure, as shown in FIG. 11. In FIG. 11, from the left, the first column represents a physical-cell identifier to which a transmitter of the first reference signal belongs, the second column represents a position of frequency-domain resources occupied by the first reference signal in frequency domain, as represented by a carrier index of a carrier to which frequency-domain resources occupied by the first reference signal belongs, the third column represents a position of the first time interval in time domain, as represented by an index of the first time interval in multiple time intervals, the fourth column represents a first parameter, and the fifth column represents an index of a first time window in a first time interval.

In Embodiment 11, the X time windows in the present disclosure are sequentially indexed, at least one of a physical-cell identifier to which a transmitter of the first reference signal in the present disclosure, a position of frequency-domain resources occupied by the first reference signal in frequency domain or a position of the first time interval in time domain in the present disclosure is used for determining a first parameter, the first parameter is a non-negative integer, and a remainder of the first parameter modulo the X is used for determining an index of the first time window in the present disclosure.

In one embodiment, the X time windows are indexed according to chronological order.

In one embodiment, the X time windows are indexed as "0, 1, 2, . . . , X−1" according to chronological order.

In one embodiment, the X time windows are indexed as "0, 1, 2, . . . , X−1" according to chronological order, and a remainder of the first parameter modulo the X is equal to an index of the first time window.

In one embodiment, the phrase that at least one of a physical cell identifier to which a transmitter of the first reference signal belongs, a position of frequency-domain resources occupied by the first reference signal in frequency domain and a position of the first time interval in time domain are used for determining the first parameter comprises that a physical-cell identifier to which a transmitter of the first reference signal belongs, a position of frequency-domain resources occupied by the first reference signal in frequency domain and a position of the first time interval in time domain are used for determining the first parameter.

In one embodiment, the phrase that at least one of a physical cell identifier to which a transmitter of the first reference signal belongs, a position of frequency-domain resources occupied by the first reference signal in frequency domain and a position of the first time interval in time domain are used for determining the first parameter comprises that a position of the frequency-domain resources occupied by the first reference signal in frequency domain and a position of the first time interval in time domain are used for determining the first parameter.

In one embodiment, the phrase that at least one of a physical cell identifier to which a transmitter of the first reference signal belongs, a position of frequency-domain resources occupied by the first reference signal in frequency domain and a position of the first time interval in time domain are used for determining the first parameter comprises that a physical-cell identifier to which a transmitter of the first reference signal belongs and a position of the first time interval in time domain are used for determining the first parameter.

In one embodiment, the phrase that at least one of a physical cell identifier to which a transmitter of the first reference signal belongs, a position of frequency-domain resources occupied by the first reference signal in frequency domain and a position of the first time interval in time domain are used for determining the first parameter comprises that a physical-cell identifier to which a transmitter of the first reference signal belongs and a position of frequency-domain resources occupied by the first reference signal in frequency domain are used for determining the first parameter.

In one embodiment, the phrase that at least one of a physical cell identifier to which a transmitter of the first reference signal belongs, a position of frequency-domain resources occupied by the first reference signal in frequency domain and a position of the first time interval in time domain are used for determining the first parameter comprises that a physical-cell identifier to which a transmitter of the first reference signal belongs is used for determining the first parameter.

In one embodiment, the phrase that at least one of a physical cell identifier to which a transmitter of the first reference signal belongs, a position of frequency-domain resources occupied by the first reference signal in frequency domain and a position of the first time interval in time domain are used for determining the first parameter comprises that a position of the frequency-domain resources occupied by the first reference signal in frequency domain is used for determining the first parameter.

In one embodiment, the phrase that at least one of a physical cell identifier to which a transmitter of the first reference signal belongs, a position of frequency-domain resources occupied by the first reference signal in frequency domain and a position of the first time interval in time domain are used for determining the first parameter comprises that a position of the first time interval in time domain is used for determining the first parameter.

In one embodiment, the phrase that at least one of a physical cell identifier to which a transmitter of the first reference signal belongs, a position of frequency-domain resources occupied by the first reference signal in frequency domain and a position of the first time interval in time domain are used for determining the first parameter comprises that at least one of a physical-cell identifier to which a transmitter of the first reference signal belongs, a position of frequency-domain resources occupied by the first reference signal in frequency domain or a position of the first time interval in time domain is used by the first-type communication node for determining the first parameter.

In one embodiment, the phrase that at least one of a physical cell identifier to which a transmitter of the first reference signal belongs, a position of frequency-domain resources occupied by the first reference signal in frequency domain and a position of the first time interval in time domain are used for determining the first parameter comprises that at least one of a physical-cell identifier to which a transmitter of the first reference signal belongs, a position of frequency-domain resources occupied by the first reference signal in frequency domain or a position of the first time interval in time domain is used for determining the first parameter based on a mapping relation.

In one embodiment, the phrase that at least one of a physical cell identifier to which a transmitter of the first reference signal belongs, a position of frequency-domain resources occupied by the first reference signal in frequency domain and a position of the first time interval in time domain are used for determining the first parameter comprises that at least one of a physical-cell identifier to which a transmitter of the first reference signal belongs, a position of frequency-domain resources occupied by the first reference signal in frequency domain or a position of the first time interval in time domain is used for determining the first parameter based on a functional relation.

In one embodiment, the phrase that at least one of a physical cell identifier to which a transmitter of the first reference signal belongs, a position of frequency-domain resources occupied by the first reference signal in frequency domain and a position of the first time interval in time domain are used for determining the first parameter comprises that at least one of a physical-cell identifier to which a transmitter of the first reference signal belongs, a position of frequency-domain resources occupied by the first reference signal in frequency domain or a position of the first time interval in time domain is used for determining the first parameter based on a table relation.

In one embodiment, the phrase that at least one of a physical cell identifier to which a transmitter of the first reference signal belongs, a position of frequency-domain resources occupied by the first reference signal in frequency domain and a position of the first time interval in time domain are used for determining the first parameter comprises that at least one of a physical-cell identifier to which a transmitter of the first reference signal belongs, a position of frequency-domain resources occupied by the first reference signal in frequency domain or a position of the first time interval in time domain is used for determining a second parameter, the second parameter is used as an initial value of a pseudo-random sequence, and the pseudo-random sequence is used for determining the first parameter.

In one embodiment, the phrase that at least one of a physical cell identifier to which a transmitter of the first reference signal belongs, a position of frequency-domain resources occupied by the first reference signal in frequency domain and a position of the first time interval in time domain are used for determining the first parameter comprises that at least one of a physical-cell identifier to which a transmitter of the first reference signal belongs, a position of frequency-domain resources occupied by the first reference signal in frequency domain or a position of the first time interval in time domain is used for determining a Frame Check Sequence (FCS), the FCS being used for determining the first parameter.

In one embodiment, a remainder of the first parameter modulo X is used by the first-type communication node for determining an index of the first time window.

In one embodiment, a remainder of the first parameter modulo X is used for determining an index of the first time window based on a mapping relation.

In one embodiment, a remainder of the first parameter modulo X is used for determining an index of the first time window based on a functional relation.

Embodiment 12

Figure 12:
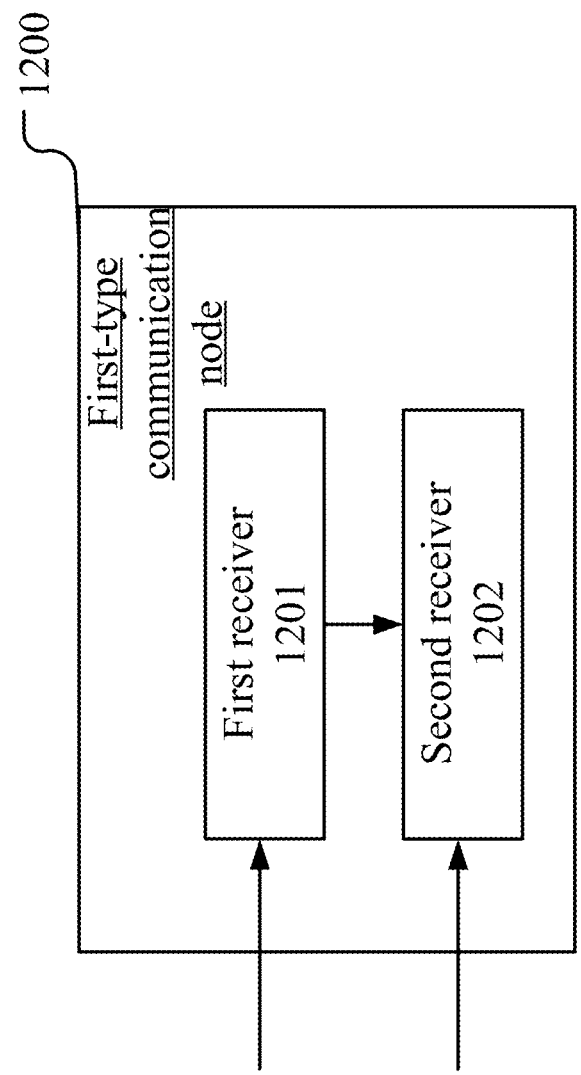
FIG. 12 illustrates a structure block diagram of a processing device in a first-type communication node according to one embodiment of the present disclosure.

Embodiment 12 illustrates a structure diagram of a processing device in a first-type communication node, as shown in FIG. 12. In FIG. 12, the first-type communication node's processing device 1200 mainly consists of a first receiver 1201 and a second receiver 1202. The first receiver 1201 comprises the transmitter/receiver 456 (including the antenna 460), the receiving processor 452 and the controller/processor 490 in FIG. 4 of the present disclosure; the second receiver 1202 comprises the transmitter/receiver 456 (including the antenna 460) and the receiving processor 452 in FIG. 4 in the present disclosure.

In Embodiment 12, a first receiver receives first information on a first carrier, the first information being used for determining a first time interval; a second receiver 1202 receives a first reference signal in a first time window on a second carrier; herein, the first time window is one of X time windows; each of the X time windows belongs to the first time interval, X being a positive integer greater than 1; at least one of a physical cell identifier to which a transmitter of the first reference signal belongs, a position of frequency-domain resources occupied by the first reference signal in frequency domain or a position of the first time interval in time domain are used for determining the first time window out of the X time windows; the first carrier and the second carrier are two different carriers; the first information is transmitted via an air interface.

In one embodiment, each of the X time windows comprises a positive integer number of subframe(s), each of the X time windows has a subframe reserved for transmitting a scheduling message for paging, and a position of an initial subframe reserved for transmitting a scheduling message for paging is fixed within a time window to which it belongs, for each of the X time windows.

In one embodiment, a first time sub-window belongs to the first time window, a time length of the first time sub-window is no longer than a time length of the first time window, and the first time sub-window comprises time-domain resources occupied by the first reference signal; a position of the first time sub-window in the first time window is pre-defined, or a position of the first time sub-window in the first time window is configured, or a position of the first time sub-window in the first time window is related to at least one of a physical-cell identifier to which a transmitter of the first reference signal belongs, a position of frequency-domain resources occupied by the first reference signal in frequency domain or a position of the first time interval in time domain.

In one embodiment, the first receiver 1201 also receives second information; the second information is used for indicating a first time length, the first time length is equal to a time length of the first time interval multiplied by an integer power of 2, the first time length is used for determining the X time windows out of the first time interval, and the second information is transmitted via the air interface.

In one embodiment, the first receiver 1201 also receives third information; the third information is used for determining a time length of the first time window, and the third information is transmitted via the air interface.

In one embodiment, the X time windows are indexed in order, at least one of a physical-cell identifier to which a transmitter of the first reference signal, a position of frequency-domain resources occupied by the first reference signal in frequency domain or a position of the first time interval in time domain is used for determining a first parameter, the first parameter is a non-negative integer, and a remainder of the first parameter modulo the X is used for determining an index of the first time window.

Embodiment 13

Figure 13:
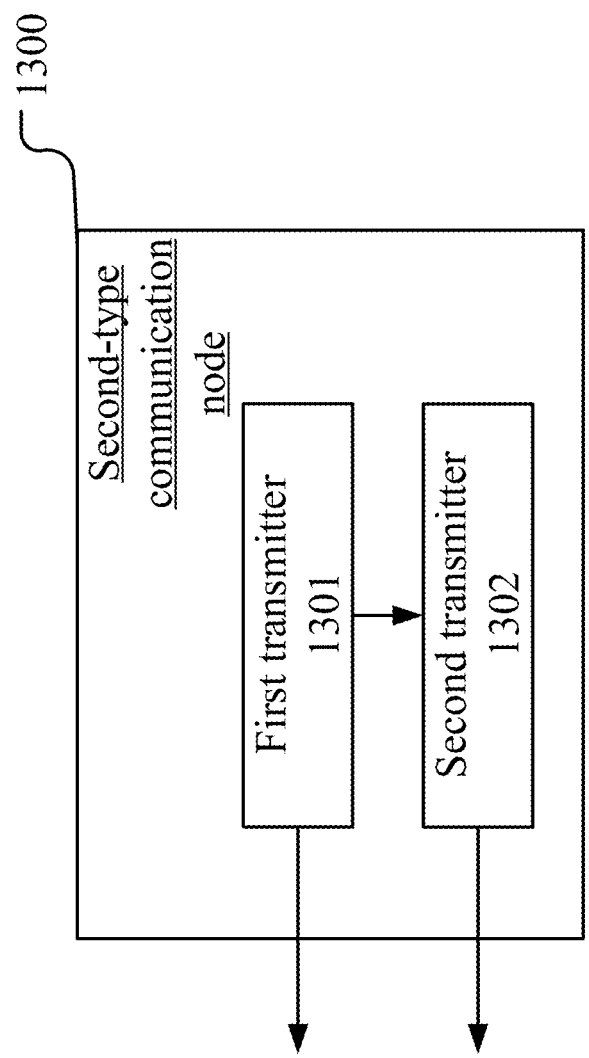
FIG. 13 illustrates a structure block diagram of a processing device in a second-type communication node according to one embodiment of the present disclosure.

Embodiment 13 illustrates a structure diagram of a processing device in a second-type communication node, as shown in FIG. 13. In FIG. 13, the second-type communication node's processing device 1300 mainly consists of a first transmitter 1301 and a second transmitter 1302. The first transmitter 1301 comprises the transmitter/receiver 416 (including the antenna 420), the transmitting processor 415 and the controller/processor 440 in FIG. 4 of the present disclosure; and the second transmitter 1302 comprises the transmitter/receiver 416 (including the antenna 420) and the transmitting processor 415 in FIG. 4 in the present disclosure.

In Embodiment 13, the first transmitter 1301 transmits first information on a first carrier, the first information being used for determining a first time interval; the second transmitter 1302 transmits a first reference signal in a first time window on a second carrier; herein, the first time window is one of X time windows; each of the X time windows belongs to the first time interval, X being a positive integer greater than 1; at least one of a physical cell identifier to which a transmitter of the first reference signal belongs, a position of frequency-domain resources occupied by the first reference signal in frequency domain or a position of the first time interval in time domain is used for determining the first time window out of the X time windows; the first carrier and the second carrier are two different carriers; the first information is transmitted via an air interface.

In one embodiment, each of the X time windows comprises a positive integer number of subframe(s), each of the X time windows has a subframe reserved for transmitting a scheduling message for paging, and a position of an initial subframe reserved for transmitting a scheduling message for paging is fixed within a time window to which it belongs, for each of the X time windows.

In one embodiment, a first time sub-window belongs to the first time window, a time length of the first time sub-window is no longer than a time length of the first time window, and the first time sub-window comprises time-domain resources occupied by the first reference signal; a position of the first time sub-window in the first time window is pre-defined, or a position of the first time sub-window in the first time window is configured, or a position of the first time sub-window in the first time window is related to at least one of a physical-cell identifier to which a transmitter of the first reference signal belongs, a position of frequency-domain resources occupied by the first reference signal in frequency domain or a position of the first time interval in time domain.

In one embodiment, the first transmitter 1301 also transmits second information; the second information is used for indicating a first time length, the first time length is equal to a time length of the first time interval multiplied by an integer power of 2, the first time length is used for determining the X time windows out of the first time interval, and the second information is transmitted via the air interface.

In one embodiment, the first transmitter 1301 also transmits third information; the third information is used for determining a time length of the first time window, and the third information is transmitted via the air interface.

In one embodiment, the X time windows are indexed in order, at least one of a physical-cell identifier to which a transmitter of the first reference signal, a position of frequency-domain resources occupied by the first reference signal in frequency domain or a position of the first time interval in time domain is used for determining a first parameter, the first parameter is a non-negative integer, and a remainder of the first parameter modulo the X is used for determining an index of the first time window.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. A first-type communication node, a UE or a terminal in the present disclosure includes but not limited to mobile phones, tablet computers, laptops, network cards, low-power devices, eMTC devices, NB-IOT devices, vehicle-mounted communication equipment and other wireless communication devices. The second-type communication node, the base station or the network side device in the present disclosure includes but is not limited to the macro-cellular base stations, micro-cellular base stations, home base stations, relay base stations, eNB, gNB, Transmitter Receiver Point (TRP) (TRP) and other wireless communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first-type communication node for wireless communications, comprising:
receiving first information on a first carrier, the first information being used for determining a first time interval; and
receiving a first reference signal in a first time window on a second carrier;
wherein the first time window is one of X time windows, each of the X time windows comprises 10 subframes before a Paging Occasion; each of the X time windows belongs to the first time interval, X being a positive integer greater than 1; at least one of a physical cell identifier to which a transmitter of the first reference signal belongs, a position of frequency-domain resources occupied by the first reference signal in frequency domain or a position of the first time interval in time domain is used for determining the first time window out of the X time windows;

the first carrier and the second carrier are two different carriers; the first information is transmitted via an air interface.

2. The method according to claim 1, wherein each of the X time windows comprises a positive integer number of subframe(s), each of the X time windows has a subframe reserved for transmitting a scheduling message for paging, and a position of an initial subframe reserved for transmitting a scheduling message for paging is fixed within a time window to which it belongs, for each of the X time windows.

3. The method according to claim 1, wherein a first time sub-window belongs to the first time window, a time length of the first time sub-window is no longer than a time length of the first time window, and the first time sub-window comprises time-domain resources occupied by the first reference signal; a position of the first time sub-window in the first time window is pre-defined, or a position of the first time sub-window in the first time window is configured, or a position of the first time sub-window in the first time window is related to at least one of a physical-cell identifier to which a transmitter of the first reference signal belongs, a position of frequency-domain resources occupied by the first reference signal in frequency domain or a position of the first time interval in time domain.

4. The method according to claim 1, also comprising:
receiving second information;
wherein the second information is used for indicating a first time length, the first time length is equal to a time length of the first time interval multiplied by an integer power of 2, the first time length is used for determining the X time windows out of the first time interval, and the second information is transmitted via the air interface.

5. The method according to claim 1, wherein the X time windows are indexed in order, at least one of a physical-cell identifier to which the transmitter of the first reference signal, a position of frequency-domain resources occupied by the first reference signal in frequency domain or a position of the first time interval in time domain is used for determining a first parameter, the first parameter is a non-negative integer, and a remainder of the first parameter modulo the X is used for determining an index of the first time window.

6. A method in a second-type communication node in wireless communication, comprising:
transmitting first information on a first carrier, the first information being used for determining a first time interval; and
transmitting a first reference signal in a first time window on a second carrier;
wherein the first time window is one of X time windows, each of the X time windows comprises 10 subframes before a Paging Occasion; each of the X time windows belongs to the first time interval, X being a positive integer greater than 1; at least one of a physical cell identifier to which a transmitter of the first reference signal belongs, a position of frequency-domain resources occupied by the first reference signal in frequency domain or a position of the first time interval in time domain is used for determining the first time window out of the X time windows; the first carrier and the second carrier are two different carriers; the first information is transmitted via an air interface.

7. The method according to claim 6, wherein each of the X time windows comprises a positive integer number of subframe(s), each of the X time windows has a subframe reserved for transmitting a scheduling message for paging, and a position of an initial subframe reserved for transmitting a scheduling message for paging is fixed within a time window to which it belongs, for each of the X time windows.

8. The method according to claim 6, wherein a first time sub-window belongs to the first time window, a time length of the first time sub-window is no longer than a time length of the first time window, and the first time sub-window comprises time-domain resources occupied by the first reference signal; a position of the first time sub-window in the first time window is pre-defined, or a position of the first time sub-window in the first time window is configured, or a position of the first time sub-window in the first time window is related to at least one of a physical-cell identifier to which a transmitter of the first reference signal belongs, a position of frequency-domain resources occupied by the first reference signal in frequency domain or a position of the first time interval in time domain.

9. The method according to claim 6, further comprising:
transmitting second information;
wherein the second information is used for indicating a first time length, the first time length is equal to a time length of the first time interval multiplied by an integer power of 2, the first time length is used for determining the X time windows out of the first time interval, and the second information is transmitted via the air interface.

10. The method according to claim 6, wherein the X time windows are indexed in order, at least one of a physical-cell identifier to which the transmitter of the first reference signal, a position of frequency-domain resources occupied by the first reference signal in frequency domain or a position of the first time interval in time domain is used for determining a first parameter, the first parameter is a non-negative integer, and a remainder of the first parameter modulo the X is used for determining an index of the first time window.

11. A first-type communication node for wireless communications, comprising:
a first receiver, receiving first information on a first carrier, the first information being used for determining a first time interval; and
a second receiver, receiving a first reference signal in a first time window on a second carrier;
wherein the first time window is one of X time windows, each of the X time windows comprises 10 subframes before a Paging Occasion; each of the X time windows belongs to the first time interval, X being a positive integer greater than 1; at least one of a physical cell identifier to which a transmitter of the first reference signal belongs, a position of frequency-domain resources occupied by the first reference signal in frequency domain or a position of the first time interval in time domain are used for determining the first time window out of the X time windows; the first carrier and the second carrier are two different carriers; the first information is transmitted via an air interface.

12. The first-type communication node according to claim 11, wherein each of the X time windows comprises a positive integer number of subframe(s), each of the X time windows has a subframe reserved for transmitting a scheduling message for paging, and a position of an initial subframe reserved for transmitting a scheduling message for paging is fixed within a time window to which it belongs, for each of the X time windows.

13. The first-type communication node according to claim 11, wherein a first time sub-window belongs to the first time window, a time length of the first time sub-window is no longer than a time length of the first time window, and the first time sub-window comprises time-domain resources occupied by the first reference signal; a position of the first time sub-window in the first time window is pre-defined, or a position of the first time sub-window in the first time window is configured, or a position of the first time sub-window in the first time window is related to at least one of a physical-cell identifier to which a transmitter of the first reference signal belongs, a position of frequency-domain resources occupied by the first reference signal in frequency domain or a position of the first time interval in time domain.

14. The first-type communication node according to claim 11, wherein the first receiver receives second information; wherein the second information is used for indicating a first time length, the first time length is equal to a time length of the first time interval multiplied by an integer power of 2, the first time length is used for determining the X time windows out of the first time interval, and the second information is transmitted via the air interface.

15. The first-type communication node according to claim 11, wherein the X time windows are indexed in order, at least one of a physical-cell identifier to which the transmitter of the first reference signal, a position of frequency-domain resources occupied by the first reference signal in frequency domain or a position of the first time interval in time domain is used for determining a first parameter, the first parameter is a non-negative integer, and a remainder of the first parameter modulo the X is used for determining an index of the first time window.

16. A second-type communication node for wireless communications, comprising:
a first transmitter, transmitting first information on a first carrier, the first information being used for determining a first time interval; and
a second transmitter, transmitting a first reference signal in a first time window on a second carrier;
wherein the first time window is one of X time windows, each of the X time windows comprises 10 subframes before a Paging Occasion; each of the X time windows belongs to the first time interval, X being a positive integer greater than 1; at least one of a physical cell identifier to which a transmitter of the first reference signal belongs, a position of frequency-domain resources occupied by the first reference signal in frequency domain or a position of the first time interval in time domain is used for determining the first time window out of the X time windows; the first carrier and the second carrier are two different carriers; the first information is transmitted via an air interface.

17. The second-type communication node according to claim 16, wherein each of the X time windows comprises a positive integer number of subframe(s), each of the X time windows has a subframe reserved for transmitting a scheduling message for paging, and a position of an initial subframe reserved for transmitting a scheduling message for paging is fixed within a time window to which it belongs, for each of the X time windows.

18. The second-type communication node according to claim 16, wherein a first time sub-window belongs to the first time window, a time length of the first time sub-window is no longer than a time length of the first time window, and the first time sub-window comprises time-domain resources occupied by the first reference signal; a position of the first time sub-window in the first time window is pre-defined, or a position of the first time sub-window in the first time window is configured, or a position of the first time sub-window in the first time window is related to at least one of a physical-cell identifier to which a transmitter of the first reference signal belongs, a position of frequency-domain resources occupied by the first reference signal in frequency domain or a position of the first time interval in time domain.

19. The second-type communication node according to claim 16, wherein the first transmitter transmits second information; wherein the second information is used for indicating a first time length, the first time length is equal to a time length of the first time interval multiplied by an integer power of 2, the first time length is used for determining the X time windows out of the first time interval, and the second information is transmitted via the air interface.

20. The second-type communication node according to claim 16, wherein the X time windows are indexed in order, at least one of a physical-cell identifier to which the transmitter of the first reference signal, a position of frequency-domain resources occupied by the first reference signal in frequency domain or a position of the first time interval in time domain is used for determining a first parameter, the first parameter is a non-negative integer, and a remainder of the first parameter modulo the X is used for determining an index of the first time window.

* * * * *